US006787597B1

(12) United States Patent
Martin et al.

(10) Patent No.: US 6,787,597 B1
(45) Date of Patent: Sep. 7, 2004

(54) WATERBORNE FILM-FORMING COMPOSITIONS CONTAINING ALTERNATING COPOLYMERS OF ISOBUTYLENE TYPE MONOMERS

(75) Inventors: Roxalana L. Martin, Pittsburgh, PA (US); Edward R. Coleridge, Lower Burrell, PA (US); Mark A. Tucker, Gibsonia, PA (US); Mary E. Grolemund, Sarver, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/357,797

(22) Filed: Feb. 4, 2003

Related U.S. Application Data

(63) Continuation-in-part of application No. 10/076,984, filed on Feb. 15, 2002, now Pat. No. 6,686,432.

(51) Int. Cl.$^7$ .................................................. C08J 3/00
(52) U.S. Cl. ....................... 524/522; 524/512; 524/514; 525/110
(58) Field of Search ................................ 524/522, 512, 524/514; 525/110

(56) References Cited

U.S. PATENT DOCUMENTS

| | | | |
|---|---|---|---|
| 2,378,629 A | 6/1945 | Hanford | 260/78 |
| 2,411,599 A | 11/1946 | Sparks et al. | 204/162 |
| 2,531,196 A | 11/1950 | Brubaker et al. | 260/85.5 |
| 3,947,338 A | 3/1976 | Jerabek et al. | 204/181 |
| 3,984,299 A | 10/1976 | Jerabek | 204/181 |
| 4,147,679 A | 4/1979 | Scriven et al. | 260/29.2 TN |
| 4,147,688 A | 4/1979 | Makhlouf et al. | 260/33.6 EP |
| 4,220,679 A | 9/1980 | Backhouse | 427/401 |
| 4,403,003 A | 9/1983 | Backhouse | 427/407.1 |
| 4,681,811 A | 7/1987 | Simpson et al. | 428/413 |
| 4,732,790 A | 3/1988 | Blackburn et al. | 427/407.1 |
| 4,798,746 A | 1/1989 | Claar et al. | 427/407.1 |
| 4,889,890 A | 12/1989 | Kerr et al. | 525/113 |
| 4,937,288 A | 6/1990 | Pettit, Jr. et al. | 525/176 |
| 4,997,900 A | 3/1991 | Brinkman | 528/45 |
| 5,071,904 A | 12/1991 | Martin et al. | 524/458 |
| 5,084,541 A | 1/1992 | Jacobs, III et al. | 528/45 |
| 5,098,947 A | 3/1992 | Metzger et al. | 524/507 |
| 5,098,955 A | 3/1992 | Pettit, Jr. | 525/194 |
| 5,202,382 A | 4/1993 | Pettit, Jr. | 525/108 |
| 5,214,101 A | 5/1993 | Pettit, Jr. et al. | 525/176 |
| 5,229,458 A * | 7/1993 | Schimmel et al. | 525/108 |
| 5,356,973 A | 10/1994 | Taljan et al. | 524/314 |
| 5,407,707 A | 4/1995 | Simeone et al. | 427/410 |
| 5,439,896 A | 8/1995 | Ito et al. | 525/107 |
| 5,508,337 A | 4/1996 | Wamprecht et al. | 524/507 |
| 5,510,444 A | 4/1996 | Halpaap et al. | 528/45 |
| 5,552,487 A | 9/1996 | Clark et al. | 525/131 |
| 5,554,692 A | 9/1996 | Ross | 525/124 |
| 5,663,240 A | 9/1997 | Simeone et al. | 525/327.3 |
| 5,710,214 A | 1/1998 | Chou et al. | 525/124 |
| 5,777,061 A | 7/1998 | Yonek et al. | 528/45 |
| 5,807,937 A | 9/1998 | Matyjaszewski et al. | 526/135 |
| 5,976,701 A | 11/1999 | Barancyk et al. | 428/423.1 |
| 5,989,642 A | 11/1999 | Singer et al. | 427/407.1 |
| 6,111,001 A | 8/2000 | Barancyk et al. | 524/211 |
| 6,114,489 A | 9/2000 | Vicari et al. | 528/84 |
| 6,197,883 B1 * | 3/2001 | Schimmel et al. | 525/111 |
| 6,281,272 B1 | 8/2001 | Baldy et al. | 523/501 |
| 2003/0018151 A1 * | 1/2003 | White et al. | |
| 2003/0171497 A1 * | 9/2003 | Coca et al. | |
| 2003/0187145 A1 * | 10/2003 | Martin et al. | |

FOREIGN PATENT DOCUMENTS

| | | | |
|---|---|---|---|
| EP | 0 594 071 | 4/1994 | C09D/201/02 |
| EP | 0 982 337 | 3/2000 | C08G/63/00 |
| WO | WO 94/10212 | 9/1996 | C08F/8/30 |
| WO | WO 97/30131 | 8/1997 | C09D/201/00 |
| WO | WO 00/26308 | 5/2000 | C09D/17/00 |
| WO | WO 00/75791 | 12/2000 | G06F/13/16 |

OTHER PUBLICATIONS

Greenley, "Q and e Values for Free Radical Copolymerizations of Vinyl Monomers and Telogens," *Polymer Handbook*, Fourth Edition, John Wiley & Sons, Inc., pp. 309–319, 1999.

Odian, "Chain Copolymerization," *Principles of Polymerization*, Third Edition, John Wiley & Sons, Inc., pp. 452–491, 1991.

Cowie, *Alternating Copolymers*, Plenum Press, pp. 1–137, 1985.

Rzaev et al., "Complex–Radical Copolymerization of 2,4, 4–trimethylpentene–1 with Maleic Anhydride," Eur. Polym. J., vol. 34, No. 7, pp. 981–985, 1998.

Mashita et al., "Alternating Copolymerization of Isobutylene and Acrylic Ester, with Alkylboron Halide," Polymer, vol. 36, No. 15, pp. 2973–2982, 1995.

Mashita et al., "Alternating Copolymers of Isobutylene and Acrylic Ester by Complexed Copolymerization," Polymer, vol. 36, No. 15, pp. 2983–2988, 1995.

Kuntz et al., "Poly [2, 2–Dimethyl–4–(methoxylcarbonyl)butylene]: Synthesis with an Ethylaluminum Sesquinchloride–Peroxide Initiator and NMR Characterization," *J. of Polymer Science*: Polymer Chemistry Edition, vol. 16, pp. 1747–1753, 1978.

(List continued on next page.)

*Primary Examiner*—Helen L. Pezzulo
(74) *Attorney, Agent, or Firm*—William J. Uhl

(57) ABSTRACT

A curable, aqueous film-forming composition is provided that includes a polymeric binder comprising reactive functional groups, a crosslinking agent having at least two functional groups that are reactive with the functional groups of the polymeric binder, and a copolymer flow control agent comprising at least 30 mol % of residues containing alternating residues from a donor monomer and from an acceptor monomer. The copolymer contains at least 15 mol % of an isobutylene type donor monomer.

A multi-component composite coating composition is also provided, comprising a base coat deposited from a pigmented film-forming composition and a transparent topcoat applied over the base coat. The topcoat is deposited from the film-forming composition described above.

36 Claims, No Drawings

OTHER PUBLICATIONS

Hirooka et al., "Complexed Copolymerization of Vinyl Compounds with Alkylaluminum Halides," *Journal of Polymer Science: Polymer Chemistry Edition*, vol. 11, pp. 1281–1306, 1973.

ASTM D–1200—94, "Standard Test Method for Viscosity by Ford Viscosity Cup," Amer. Soc. Test. Mat., pp. 103–105, 1994.

ASTM D–2369—92, "Standard Test Method for Volatile Content of Coatings," *Amer. Soc. Test. Mat.*, pp. 46–48, 1992.

ASTM D–3359—97, "Standard Test Methods for Measuring Adhesion by Tape Test," Amer. Soc. Test. Mat., pp. 1–7, 1998.

ASTM D–4370—84, "Standard Test Methods for Acid and Base Milliequivalent Content of Electrocoat Bath," *Amer. Soc. Test. Mat.*, pp. 780–782, 1984.

"Reference Method 24: Determination of Volatile Matter Content, Water Content, Density, Volume Solids, and Weight Solids of Surface Coatings," *Federal Register*, EPA Reference Methods 24 and 24 A, vol. 57, No. 133, pp. 125–127, 1992.

* cited by examiner

WATERBORNE FILM-FORMING COMPOSITIONS CONTAINING ALTERNATING COPOLYMERS OF ISOBUTYLENE TYPE MONOMERS

CROSS-REFERENCE TO RELATED APPLICATION

This application is a continuation-in-part of U.S. patent application Ser. No. 10/076,984, entitled "Alternating Copolymers of Isobutylene Type Monomers", filed on Feb. 15, 2002 now U.S. Pat. No. 6,686,432.

BACKGROUND OF THE INVENTION

1. Field of the Invention

The present invention relates generally to the use of copolymers of ethylenically unsaturated monomers in waterborne film-forming compositions. More specifically, the present invention is directed to waterborne film-forming compositions comprising copolymers containing isobutylene type monomers.

2. Description of Related Art

It is often observed that monomers that do not readily homopolymerize are able to undergo rapid copolymerization reactions with each other. The most typical situation occurs when a strong electron donating monomer is mixed with a strong electron accepting monomer from which a regular alternating copolymer results after free radical initiation. Maleic-anhydride is a widely used example of a strong electron accepting monomer. Styrene and vinyl ethers are typical examples of an electron donating monomer. Systems, such as maleic anhydride—styrene, are known to form charge transfer complexes, which tend to place the monomers in an alternating sequence prior to initiation. The application of the free radical initiator "ties" the ordered monomers together to form an alternating copolymer (Cowie, Alternating Copolymers, Plenum, N.Y. (1985)).

U.S. Pat. No. 2,378,629 to Hanford and U.S. Pat. No. 4,151,336 to Sackmann et al. disclose that even when a moderately electron donating monomer, such as diisobutylene, is copolymerized with a strong electron acceptor monomer, such as maleic anhydride, an alternating copolymer results.

When a moderately electron donating monomer, such as isobutylene, is copolymerized with a moderately electron accepting monomer, such as an acrylic ester poor incorporation of the electron donating monomer results. For example, free radical copolymerization of isobutylene (IB) and acrylic monomers have resulted in copolymers that contain at most 20–30% of IB and have low molecular weights because of degradative chain transfer of IB. Examples of such copolymerizations of IB are disclosed by U.S. Pat. No. 2,411,599 to Sparks et al. and U.S. Pat. No. 2,531,196 to Brubaker et al.

The ability to make copolymers of acrylic monomers and IB type monomers is desired in the art. For example, many patents express the potential for using IB-containing polymers in coating compositions. To illustrate, U.S. Pat. No. 6,114,489 to Vicari et al. discloses a coating composition that includes a functional acrylic resin binder; a co-reactant capable of reaction with the functionality of the acrylic binder; a degasser; and a hyperbranched polyester flow and leveling agent. IB is suggested as a potential co-monomer for use in the acrylic binder as part of a long list of monomers. U.S. Pat. No. 5,552,487 to Clark et al. discloses powder coating compositions that include a copolymer having a reactive functionality and a suitable crosslinking agent capable of reaction with the reactive functionality of the copolymer. The copolymer is made by copolymerizing functional monomers with other monomers, isobutylene being one among many listed as potential co-monomers. Although only two are referenced herein, of the many patents that express the possibility of using isobutylene-type co-monomers, none actually shows or discloses a working example of such a copolymer.

The fact that few examples of isobutylene-type monomer-containing copolymers are found is due to the generally non-reactive nature of isobutylene with acrylic and methacrylic monomers. Reactivity ratios for monomers can be calculated using the Alfrey-Price Q-e values (Robert Z. Greenley, Polymer Handbook, Fourth Edition, Brandrup, Immergut and Gulke, editors, Wiley & Sons, New York, N.Y., pp. 309–319 (1999)). The calculations may be carried out using the formulas I and II:

$$r_1 = (Q_1/Q_2)\exp\{-e_1(e_1-e_2)\} \quad \text{I}$$

$$r_2 = (Q_2/Q_1)\exp\{-e_2(e_2-e_1)\} \quad \text{II}$$

where $r_1$ and $r_2$ are the respective reactivity ratios of monomers 1 and 2, and $Q_1$ and $Q_2$ and $e_1$ and $e_2$ are the respective reactivity and polarity values for the respective monomers (Odian, *Principals of Polymerization*, $3^{rd}$ Ed., Wiley-Interscience, New York, N.Y., Chapter 6, pp. 452–467 and 489–491 (1991)). Table 1 shows the calculated reactivity ratios of selected monomers with isobutylene:

TABLE 1

| Monomer | $r_1$ (isobutylene) | $r_2$ |
|---|---|---|
| Methyl acrylate | 0.10 | 13.67 |
| Glycidyl methacrylate | 0.08 | 34.17 |
| Methacrylic acid | 0.09 | 39.71 |

As one skilled in the art of polymer chemistry can appreciate, when $r_1$ is near zero and $r_2$ has a value of 10 or more, monomer 2 is reactive toward both monomers and monomer 1 is reactive toward neither monomer. In other words, it is extremely difficult to prepare copolymers having significant amounts of both monomers. It is not surprising then that few examples of coating compositions can be found that include isobutylene-type monomer-containing copolymers, because the monomers do not tend to copolymerize.

A few examples of acrylic ester or acrylonitrile copolymers made by copolymerizing with monomers such as propylene, isobutylene, and styrene, have been accomplished in the presence of Lewis acids, such as alkylaluminum halides, to give 1:1 alternating copolymers. The alternating copolymers were obtained when the concentration ratio of the Lewis acids to the acrylic esters was 0.9 and the concentration of IB was greater than the concentration of the acrylic esters (Hirooka et al., J. Polym. Sci. Polym. Chem., 11, 1281 (1973)). The metal halides vary the reactivity of the monomers by complexing with them. The electron donor monomer—electron acceptor monomer—metal halide complex leads to alternating copolymers (Mashita et al. Polymer, Vol. 36, No. 15, pp. 2973–2982, (1995)).

Copolymers of IB and methyl acrylate (MA) have also been obtained by using ethyl aluminum sesquichloride and 2-methyl pentanoyl peroxide as an initiating system. The resulting copolymer had an alternating structure, with either low (Kuntz et al, J. Polym. Sci. Polym. Chem., 16, 1747 (1978)) or high isotacticity in the presence of $EtAlCl_2$ (10 molar % relative to MA). (Florjanczyk et al., Makromol. Chem., 183, 1081 (1982)).

Another method for making IB copolymers with acrylic esters involved alkyl boron halide, which was found to be much more active than alkyl aluminum halides in forming alternating copolymers. The resulting copolymer was an elastomer of high tensile strength and high thermal decomposition temperature with good oil resistance, especially at elevated temperatures (Mashita et al., Polymer, 36, 2983 (1995)).

U.S. Pat. No. 5,807,937 to Matyjaszewski et al. discloses a method of making alternating copolymers of isobutylene and methyl acrylate using an atom transfer radical polymerization (ATRP) process. The method requires the use of a suitable ATRP initiator, such as 1-phenylethyl bromide, and suitable transition metal salts, such as CuBr, with a ligand, such as 2,2'-bipyridyl, to perform the complex redox initiation and propagation steps of the polymerization process.

Copolymers containing relatively high amounts ($\geq 30$ mol %) of IB and acrylic esters have only been attained by free radical polymerization when Lewis acids or ATRP initiation systems have been employed. The polymer that results from such processes requires expensive and time-consuming clean up to remove the transition metal salt and/or Lewis acid residues in order to make the polymer commercially useful.

Coating compositions, liquid and powder coatings for example, are used in a wide variety of applications, including for example, the automotive, appliance, and industrial markets. Coatings are often used to provide decorative qualities and/or corrosion protection to the substrates over which they are applied. Correspondingly, applied coatings are typically required to have at least a continuous defect-free surface. The automotive industry has particularly strict requirements as to the smoothness of the coatings that are used, as is the case with automotive clear topcoat compositions.

Coating compositions typically contain a flow control agent (also referred to as a flow modifier) to improve the appearance of the cured coating. Flow control agents have surface active properties and are thought to improve the appearance of a cured coating by altering the flow and leveling of the applied coating during its cure cycle. Flow control agents containing functional groups, such as carboxylic acid groups and/or hydroxyl groups, are known and, in addition to enhancing appearance, can also improve adhesion of the coating to the substrate over which it is applied, and/or improve the adhesion or compatibility of a subsequently applied coating.

Coating compositions are typically required to provide optimum properties, such as appearance and/or corrosion resistance, at a minimum film thickness. For example, in the automotive industry clear topcoats are typically required to have cured film thickness of no greater than 50 microns (2 mils). Advantages associated with coatings applied at lower film thickness include, for example, reduced material costs and weight gain of the coated ware, which is particularly desirable in the aircraft industry. However, as the film build of an applied coating composition is decreased, the appearance of the resulting cured coating typically diminishes, for example, as evidenced by lower measured gloss values.

In addition to the application of coatings at lower film builds, investigation and development in recent years has been directed toward reducing the environmental impact of coating compositions, in particular, the associated emissions into the air of volatile organics during their use. Accordingly, interest in coatings having lower volatile organic content (VOC), for example, waterborne coatings and high solids coatings, has been increasing. In the absence of solvents that can enhance the flow and leveling of an applied coating, a flow control agent can be a critical component in a waterborne film-forming composition.

Copolymer compositions that contain Lewis acids and/or transition metals intermingled with the copolymer can have a number of drawbacks when used commercially, as in coatings, for example. First, some Lewis acids and transition metals are toxic and may have adverse environmental effects if they are leached from the copolymer and enter the environment. Second, in coating applications the Lewis acids and transition metals may lead to poor stability when exposed to UV light or simply cause the coating to discolor. In other applications the Lewis acids and transition metals may react with other ingredients in a formulation resulting in undesired properties, such as a shortened shelf life for a given formulation.

It would be desirable to provide copolymers containing isobutylene type monomers for use as flow control additives. However, such copolymers may not be made using Lewis acids and/or transition metals as catalysts, and are preferably substantially free of Lewis acids and/or transition metals, in order to overcome any drawbacks associated with the use of Lewis acids and/or transition metals in coating compositions.

SUMMARY OF THE INVENTION

The present invention is directed to curable, aqueous (waterborne) film-forming compositions comprising:

(a) a polymeric binder containing two or more reactive functional groups;

(b) a crosslinking agent having at least two functional groups which are reactive with the reactive functional groups of (a); and (c) a copolymer flow control agent comprising at least 30 mol % of residues having the following alternating structural units:

wherein DM represents a residue from a donor monomer, and AM represents a residue from an acceptor monomer. At least 15 mol % of the copolymer comprises at least one donor monomer having the following structure (I):

wherein $R^1$ is linear or branched $C_1$ to $C_4$ alkyl, $R^2$ is selected from the group consisting of methyl, linear, cyclic or branched $C_1$ to $C_{20}$ alkyl, alkenyl, aryl, alkaryl and aralkyl. In a specific embodiment, at least 15 mol % of the copolymer comprises an acrylic monomer as an acceptor monomer. The copolymer may contain at least one salt group or salt forming group to aid in water dispersibility. The copolymer composition is preferably substantially free of Lewis acids and transition metals.

A multi-component composite coating composition is also provided comprising a base coat deposited from a pigmented film-forming composition and a transparent topcoat applied over the base coat. The topcoat is deposited from the film-forming composition described above.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about". Various numerical ranges are disclosed in this patent application. Because these ranges are continuous, they include every value between the minimum and maximum values. Unless expressly indicated otherwise, the various numerical ranges specified in this application are approximations.

The curable film-forming composition of the present invention may be any of the waterborne compositions useful in coatings applications, particularly automotive applications, as known by those skilled in the art. Particularly useful polymeric film-forming resins suitable as the polymeric binder (a) are acrylic polymers, polyesters, including alkyds, and polyurethanes. Generally, these polymers can be any polymers of these types made by any method known to those skilled in the art where the polymers are water dispersible or emulsifiable and preferably of limited water solubility. The functional groups of the polymeric binder (a) may be selected from the group consisting of hydroxyl, carbamate, blocked isocyanate, primary amine, secondary amine, amide, urea, urethane, vinyl and mixtures thereof.

Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride; and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl) acrylamides and N-(alkoxymethyl)methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of carboxylic acids include, but are not limited to, saturated monocarboxylic acids, such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether, and para-(tertiary butyl) phenyl glycidyl ether. Preferred glycidyl esters include those of the structure:

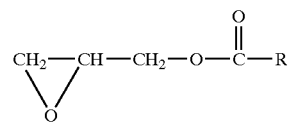

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylicpolyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols, such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other useful carbamate functional monomers are disclosed in U.S. Pat. No. 5,098,947, which is incorporated herein by reference. Other useful carbamate functional monomers are disclosed in U.S. Pat. No. 5,098,947, which is incorporated herein by reference.

Amide functionality may be introduced to the acrylic polymer by using suitably functional monomers in the preparation of the polymer, or by converting other functional groups to amido groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of the aqueous coating compositions, or can be prepared via organic solution polymerization techniques with groups capable of salt formation such as acid or amine groups. Upon neutralization of these groups with a base or acid, the polymers can be dispersed into aqueous medium. Generally, any method of producing such polymers that is known to those skilled in the art utilizing art recognized amounts of monomers can be used.

Besides acrylic polymers, the polymeric film-forming resin suitable as the polymeric binder (a) in the coating composition may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as blocked isocyanate, primary amine, secondary amine, amide, urea, and urethane may be incorporated into the polyester or alkyd resin as desired using suitably functional reactants if available, or conversion reactions as necessary to yield the desired functional groups. Such techniques are known to those skilled in the art.

Polyurethanes can also be used as the polymeric binder (a) in the film-forming composition of the present invention. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate, and toluene diisocyanate. Examples of suitable aliphatic diisocyanates are straight chain aliphatic diisocyanates, such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups which, upon neutralization with bases such as amines, allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as blocked isocyanate, primary amine, secondary amine, amide, and urea may be incorporated into the polyurethane as desired using suitably functional reactants if available, or conversion reactions as necessary to yield the desired functional groups. Such techniques are known to those skilled in the art.

The waterborne coating composition of the present invention may be cationic, anionic, or nonionic, but typically it is anionic. Suitable waterborne coating compositions are disclosed in U.S. Pat. No. 4,403,003, where the polymeric resinous compositions used in preparing these compositions can be used as the polymeric binder (a) in the practice of this invention. Also, water-based polyurethanes such as those prepared in accordance with U.S. Pat. No. 4,147,679 can be used as the polymeric binder (a) in the coating composition of the present invention. Further, it is possible to prepare an aqueous dispersion of a blend of acrylic and polyester and/or polyurethane materials in microparticulate form by a high-stress technique using a homogenizer. This technique is preferably used to prepare the coating composition of the present invention and is described in U.S. Pat. No. 5,071,904, incorporated herein by reference.

In this technique, the polymeric binder (a) is a latex which comprises polymeric microparticles prepared by forming a mixture in aqueous medium. The mixture contains an ethylenically unsaturated monomer or mixture of ethylenically unsaturated monomers with greater than 30 percent by weight of a substantially hydrophobic polymer. The percent by weight is based on the total weight of ethylenically unsaturated monomer(s) and hydrophobic polymer. Most preferably, the hydrophobic polymer is essentially free of repeating acrylic or vinyl units in the polymer backbone and has a number average molecular weight of greater than about 300, as determined by gel permeation chromatography using a polystyrene standard. The hydrophobic polymer is preferably a polyester or polyurethane. The monomer(s) and hydrophobic polymer are particularized into microparticles by high-stress techniques using a homogenizer followed by polymerizing the ethylenically unsaturated monomer(s) to form polymeric microparticles which are stably dispersed in the aqueous medium. These microparticles can be internally crosslinked so as to form microgels.

The polymeric binder (a) is generally present in the film-forming composition in amounts of about 55 to 99 percent by weight, typically about 55 to 90 percent by weight and, more often, about 55 to about 85 weight percent based on the total weight of resin solids in the film-forming composition.

As mentioned above, the waterborne film-forming composition of the present invention further includes (b) a crosslinking agent having at least two functional groups which are reactive with the functional groups of the polymeric binder (a). Suitable crosslinking agents include aminoplasts, polyisocyanates, polyacids, anhydrides, and mixtures thereof. Useful aminoplast resins are based on the addition products of formaldehyde with an amino or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal, and the like.

Condensation products of other amines and amides can also be used, for example, aldehyde condensates of triazines, diazines, triazoles, guanadines, guanamines, and alkyl- and aryl-substituted derivatives of such compounds, including alkyl- and aryl-substituted ureas and alkyl- and aryl- substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto4,6-diaminopyrimidine and carbamoyl triazines of the formula $C_3N_3(NHCOXR)_3$ where X is nitrogen, oxygen or carbon, and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins preferably contain methylol or similar alkylol groups and, in most instances, at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The preferred aminoplast resins are partially alkylated with methanol or butanol.

Polyisocyanate crosslinking agents can be prepared from a variety of isocyanate-containing materials. Most often, the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate, and 4,4'-diphenylmethylene diisocyanate. In addition, blocked polyisocyanate prepolymers of various polyols, such as polyester polyols, can also be used. Examples of suitable blocking agents include those materials that would unblock at elevated temperatures, such as lower aliphatic alcohols including methanol, oximes such as methyl ethyl ketoxime, lactams such as caprolactam, and pyrazoles such as 3,5-dimethyl pyrazole.

Examples of polycarboxylic acids that are suitable for use as the crosslinking agent in the aqueous curable film-forming composition of the present invention include those described in U.S. Pat. No. 4,681,811, at column 6, line 45 to column 9, line 54. Suitable polyanhydrides include those disclosed in U.S. Pat. No. 4,798,746, at column 10, lines 16–50, and in U.S. Pat. No. 4,732,790, at column 3, lines 41–57.

Generally, the crosslinking agent (b) is present in an amount ranging from about 1 to about 45 weight percent based on the total weight of resin solids in the film-forming composition, typically about 10 to about 45 weight percent and, more often, about 15 to about 45 weight percent.

In one embodiment of the invention, the film-forming composition of the invention comprises at least one thermosettable aqueous dispersion containing polymeric microparticles as component (a) having a functionality adapted to react with a crosslinking agent. In particular, components (a) and (b) are substantially hydrophobic and are prepared as an aqueous dispersion comprising polymeric microparticles, prepared by mixing components (a) and (b) together under high shear conditions prior or simultaneous to incorporation of the flow control agent (c). The film-forming composition is capable of forming a generally continuous film at ambient temperature.

As used herein, the term "dispersion" means that the microparticles are capable of being distributed throughout water as finely divided particles, such as in a latex. See *Hawley's Condensed Chemical Dictionary,* (12th Ed. 1993) at page 435, which is hereby incorporated by reference. The uniformity of the dispersion can be increased by the addition of wetting, dispersing or emulsifying agents (surfactants), which are discussed below.

The polymeric microparticles are prepared by mixing together under high shear conditions (a) at least one substantially hydrophobic polymeric binder having reactive functional groups, for example, acid functional groups; and (b) at least one hydrophobic crosslinking agent containing functional groups reactive with the functional groups of the polymeric binder (a). As used herein, the phrase "acid functional" means that the polymeric binder (a) contains groups which can give up a proton to a base in a chemical reaction; a substance that is capable of reacting with a base to form a salt; or a compound that produces hydronium ions, $H_3O^+$, in aqueous solution. See Hawley's at page 15 and K. Whitten et al., *General Chemistry,* (1981) at page 192, which are hereby incorporated by reference.

The term "substantially hydrophobic", as used herein, means that the material thus described is essentially not compatible with, does not have an affinity for, and/or is not capable of dissolving in water using conventional mixing means. That is, upon mixing a sample of the material with an organic component and water, a majority of the material is in the organic phase and a separate aqueous phase is observed. See *Hawley's Condensed Chemical Dictionary,* (12th Ed. 1993) at page 618.

Typically, the acid value of the hydrophobic polymeric binder (a) is below 50, often the acid value is below 25, more often ranging from 10 to 20. The amount of acid functionality in a resin can be measured by acid value. As used herein and in the claims, "acid value" refers to the number of milligrams of KOH per gram (mg KOH/g) of solid required to neutralize the acid functionality in the resin. In order for the hydrophobic polymer to be substantially hydrophobic, the hydrophobic polymer must not contain enough acid or ionic functionality to allow it to form stable dispersions in water using conventional dispersion techniques. Also, it should be understood that in the case where the acid value of the hydrophobic polymer is about 0, a suitable surfactant can be used to stably disperse the polymer in aqueous media by applying high-stress techniques. Anionic, cationic, and nonionic surfactants are suitable for use in the aqueous dispersions of the present invention, with anionic surfactants being preferred. Non-limiting examples of suitable anionic surfactants include the dimethylethanolamine salt of dodecylbenzenesulfonic acid, sodium dioctylsulfosuccinate, salts of ethoxylated nonylphenol sulfate and sodium dodecyl benzene sulfonate. Polymeric surfactants also can be used. The above-described surfactants are typically present in the dispersion in an amount of less than 2 percent by weight, preferably less than 1 percent by weight, based on total resin solids weight present in the dispersion.

Hydrophobic polymers having low acid values can be considered to be water-dispersible if they contain other hydrophilic components, such as hydroxyl groups or poly (ethylene oxide) groups, in an amount sufficient to effectuate dispersibility of the polymer in aqueous media. However, it should be understood that for purposes of the present invention, such polymers are not considered to be substantially hydrophobic if they are water-dispersible, regardless of their acid value.

The substantially hydrophobic polymeric binder (a) can be an acrylic polymer prepared using monomers described above.

In a particular embodiment, the polymeric binder (a) is pre-formed and then combined with the hydrophobic crosslinking agent (b), which is discussed in detail below, and added to an aqueous medium to form a pre-emulsion mixture. Generally, a neutralizing agent is added to the polymer/crosslinking agent mixture prior to combining with the aqueous medium to facilitate the dispersion. Alternatively, the polymeric binder (a) is formed by free radical-initiated polymerization in the presence of the hydrophobic crosslinking agent (b). It should be understood that when the polymeric binder (a) is prepared in the presence of the hydrophobic crosslinker (b), the final reaction product is taken to have the same composition, characteristics, and physical properties as if pre-formed under conventional free-radical polymerization conditions.

Suitable methods for homo- and co-polymerizing ethylenically unsaturated monomers and/or other addition polymerizable monomers and pre-formed polymers are well known to those skilled in the art of polymers and further discussion thereof is not believed to be necessary in view of the present disclosure. For example, polymerization of the ethylenically unsaturated monomers can be carried out in bulk, in aqueous or organic solvent solution such as xylene, methyl isobutyl ketone and n-butyl acetate, in emulsion, or in aqueous dispersion. *Kirk-Othmer Encyclopedia of Chemical Technology*, Vol. 1 (1963) at page 305. The polymerization can be effected by means of a suitable initiator system, which typically includes free radical initiators such as benzoyl peroxide or azobisisobutyronitrile. Molecular weight can be controlled by choice of solvent or polymerization medium, concentration of initiator or monomer, temperature, and the use of chain transfer agents. If additional information is needed, such polymerization methods are disclosed in *Kirk-Othmer*, Vol. 1 at pages 203–205, 259–297 and 305–307, which is hereby incorporated by reference.

The number average molecular weight of the pre-formed hydrophobic polymeric binder (a) can range from about 500 to about 100,000, and preferably about 1,000 to about 10,000. Unless indicated otherwise, molecular weights, as used herein and in the claims, are expressed as number average molecular weights as determined by gel permeation chromatography using polystyrene as a standard.

The glass transition temperature ($T_g$) of the hydrophobic polymeric binder (a) is typically less than 100° C., often less than 50° C., more often less than 35° C., even more often less than 30° C., and most often less than 25° C. The $T_g$ of the hydrophobic polymeric binder (a) is also typically at least −50° C., often at least −25° C., more often at least −20° C., even more often at least −10° C., and most often at least 0° C. The $T_g$ of the hydrophobic polymeric binder (a) can range between any combination of these values inclusive of the recited ranges.

The microparticles also comprise at least one hydrophobic crosslinking agent (b) which contains functional groups reactive with the functional groups of the hydrophobic polymeric binder (a). Selection of hydrophobic crosslinking agents suitable for use in the thermosettable dispersions of the present invention is dependent upon the reactive functional groups associated with component (a).

Suitable hydrophobic crosslinking agents include those disclosed above. If desired, mixtures of hydrophobic crosslinking agents can be used.

As aforementioned, the dispersion of polymeric microparticles is prepared by mixing together the above-described components (a) and (b) under high shear conditions. As used herein, the term "high shear conditions" is meant to include not only high stress techniques, such as by the liquid-liquid impingement techniques discussed in detail below, but also high speed shearing by mechanical means. It should be understood that, if desired, any mode of applying stress to the pre-emulsification mixture can be utilized so long as sufficient stress is applied to achieve the requisite particle size distribution.

Generally, the dispersion is prepared as follows. The hydrophobic polymeric binder (a) and the hydrophobic crosslinking agent (b) and, if desired, other ingredients such as neutralizing agents, external surfactants, catalysts, flow additives, and the like are mixed together with water under agitation to form a semi-stable oil-in-water pre-emulsion mixture. Component (c) may be added to the pre-emulsion at this point. Although the pre-emulsion mixture can be stabilized using external surfactants, for purposes of the present invention this is not preferred. The pre-emulsion mixture is then subjected to sufficient stress to effect formation of polymeric microparticles of uniformly fine particle size. Residual organic solvents are then removed azeotropically under reduced pressure distillation at low temperature (i.e., less than 40° C.) to yield a substantially organic solvent-free stable dispersion of polymeric microparticles.

For the present application, the pre-formed, substantially hydrophobic polymeric binder (a) (or the ethylenically unsaturated monomers used to prepare the polymeric binder (a)) together with the hydrophobic crosslinker (b) are referred to as the organic component. The organic component generally also comprises other organic species.

The dispersions of this embodiment of the present invention typically are prepared as oil-in-water emulsions. That is, the aqueous medium provides the continuous phase in which the polymeric microparticles are suspended as the organic phase.

The aqueous medium generally is exclusively water. However, for some polymer systems, it can be desirable to also include a minor amount of inert organic solvent which can assist in lowering the viscosity of the polymer to be dispersed. Typically, the amount of organic solvent present in the aqueous dispersion of the present invention is less than 20 weight percent, usually less than 5 weight percent, and most often less than 2 weight percent based on the total weight of the dispersion. For example, if the organic phase has a Brookfield viscosity greater than 1000 centipoise at 25° C. or a W Gardner Holdt viscosity, some solvent can be used. Examples of suitable solvents which can be incorporated in the organic component are xylene, methyl isobutyl ketone and n-butyl acetate.

As was mentioned above, the mixture preferably is subjected to the appropriate stress by use of a MICROFLUIDIZER® emulsifier which is available from Microfluidics Corporation in Newton, Mass. The MICROFLUIDIZER® high-pressure impingement emulsifier is described in detail in U.S. Pat. No. 4,533,254, which is hereby incorporated by reference. The device consists of a high-pressure (up to about $1.4 \times 10^5$ kPa (20,000 psi)) pump and an interaction chamber in which emulsification takes place. The pump forces the mixture of reactants in aqueous medium into the chamber where it is split into at least two streams which pass at very high velocity through at least two slits and collide, resulting in the formation of small particles. Generally, the pre-emulsion mixture is passed through the emulsifier at a pressure of between about $3.5 \times 10^4$ and about $1 \times 10^5$ kPa (5,000 and 15,000 psi). Multiple passes can result in smaller average particle size and a narrower range for the particle size distribution. When using the aforesaid MICROFLUIDIZER® emulsifier, stress is applied by liquid-liquid impingement as has been described. As mentioned above, other modes of applying stress to the pre-emulsification mixture can be utilized so long as sufficient stress is applied to achieve the requisite particle size distribution. For example, one alternative manner of applying stress would be the use of ultrasonic energy.

Stress is described as force per unit area. Although the precise mechanism by which the MICROFLUIDIZER® emulsifier stresses the pre-emulsification mixture to particulate is not thoroughly understood, it is theorized that stress is exerted in more than one manner. It is believed that one manner in which stress is exerted is by shear; that is, the force is such that one layer or plane moves parallel to an adjacent, parallel plane. Stress can also be exerted from all sides as a bulk, compression stress. In this instance, stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by any particular theory, it is believed that both shear and cavitation contribute to producing the stress which particulates the pre-emulsification mixture.

As discussed above, the substantially hydrophobic polymeric binder (a) alternatively can be prepared in the presence of the hydrophobic crosslinker (b). If this method is employed, the polymerizable ethylenically unsaturated monomers used to prepare the hydrophobic polymeric binder (a) and the hydrophobic crosslinker (b) are typically combined with a surfactant and blended with an aqueous medium to form a pre-emulsion mixture. The flow control agent (c) may or may not be present in the pre-emulsion. The pre-emulsion mixture is then subjected to high-stress conditions as described above to form microparticles. The polymerizable species within each particle are subsequently polymerized under conditions sufficient to produce polymeric microparticles which are stably dispersed in the aqueous medium.

Typically, a surfactant or dispersant is present to stabilize the dispersion. The surfactant is usually present when the organic component referred to above is mixed into the aqueous medium prior to formation of the microparticles. Alternatively, the surfactant can be introduced into the medium at a point just after the microparticles have been formed. The surfactant, however, can be an important part of the particle forming process and is often necessary to achieve the requisite dispersion stability. The surfactant also can be employed to prevent the emulsified particles from forming agglomerates.

Anionic, cationic, and nonionic surfactants such as those discussed above are suitable for use in the aqueous dispersions of the present invention, with anionic surfactants being preferred. Other materials well known to those skilled in the art are also suitable for use herein. Generally, both ionic and nonionic surfactants are used together and the amount of surfactant ranges from about 1 percent to about 10 percent, preferably less than 2 percent, the percentage based on the total solids.

In order to conduct the polymerization of the ethylenically unsaturated monomers in the presence of the hydrophobic crosslinker, a free radical initiator is usually present. Both water-soluble and oil-soluble initiators can be used. Examples of water-soluble initiators include ammonium peroxydisulfate, potassium peroxydisulfate, and hydrogen peroxide. Examples of oil-soluble initiators include t-butyl hydroperoxide, dilauryl peroxide, and 2,2'-azobis (isobutyronitrile). Generally, the reaction is carried out at a temperature ranging from 20° C. to 80° C. The polymerization can be carried out in either a batch or a continuous process. The length of time necessary to carry out the polymerization can range from 10 minutes to 6 hours. The processes by which the polymeric microparticles can be formed are described in detail in U.S. Pat. No. 5,071,904, which is incorporated herein by reference.

Once the microparticles have been formed and the polymerization process is complete, the resultant product is a stable dispersion of polymeric microparticles in an aqueous medium which can contain some organic solvent. The organic solvent is typically removed via reduced pressure distillation at a temperature of less than 40° C. The final product is a stable dispersion, substantially free of organic solvent, wherein both the substantially hydrophobic polymeric binder (a) and the substantially hydrophobic crosslinking agent (2) comprise each microparticle. By "stably dispersed" is meant that the polymeric microparticles neither settle nor coagulate nor flocculate upon standing. As was stated above, a very important aspect of the polymeric microparticle dispersions is that the particle size is uniformly small. Generally, the microparticles have a mean ranging diameter from about 0.01 micrometers to about 10 micrometers. Preferably, the mean diameter of the particles after polymerization ranges from about 0.05 micrometer to about 0.5 micrometer. The particle size can be measured with a particle size analyzer, such as the Coulter N4 instrument commercially available from Coulter.

When the film-forming composition of the present invention comprises an aqueous dispersion of polymeric microparticles, the film-forming composition may further comprise one or more hydrophilic crosslinking agents which are adapted to react with the functional groups of the polymeric microparticles to provide additional curing of the film-forming composition. Non-limiting examples of suitable crosslinking agents include blocked polyisocyanates and aminoplast resins as are described generally above which are hydrophilically modified or otherwise adapted to be water soluble or water dispersible. The hydrophilic crosslinking agent or mixture of crosslinking agents used in the film-forming composition is dependent upon the functionality associated with the polymeric microparticles. Most often, the polymeric microparticles are hydroxyl and/or carbamate functional and the hydrophilic crosslinking agent, when employed, is a hydrophilically modified blocked polyisocyanate or aminoplast.

A hydrophilic blocked polyisocyanate suitable for use as the hydrophilic crosslinking agent is 3,5-dimethyl pyrazole blocked hydrophilically modified isocyanurate of 1,6-hexamethylene diisocyanate which is commercially available as BI 7986 from Baxenden Chemicals, Ltd. in Lancashire, England. Exemplary suitable aminoplast resins are those which contain methylol or similar alkylol groups, a portion of which have been etherified by reaction with a lower alcohol, preferably methanol, to provide a water-soluble/dispersible aminoplast resin, for example, the partially methylated aminoplast resin CYMEL 385, which is commercially available from Cytec Industries, Inc. Preferred hydrophilic crosslinking agents include hydrophilically modified blocked polyisocyanates.

When employed, the hydrophilic crosslinking agent typically is present in the film-forming composition in an amount ranging up to at least 10 weight percent, often at least 10 to at least 20 weight percent, and more often from at least 20 to at least 30 weight percent based on total resin solids weight in the film-forming composition. The hydrophilic crosslinking agent also is typically present in the film-forming composition in an amount ranging from less than 70 to less than 60 weight percent, often from less than 60 to less than 50 weight percent, and more often from less than 50 to less than 40 weight percent, based on total resin solids weight of the film-forming composition. The hydrophilic crosslinking agent can be present in the film-forming composition in an amount ranging between any combination of these values inclusive of the recited ranges.

The curable, aqueous film-forming compositions of the present invention further comprise a copolymer flow control agent (c).

As used herein, the term "copolymer" is meant to include a synthesized copolymer as well as residues from initiators, catalysts, and other elements attendant to the synthesis of the copolymer, but not covalently incorporated thereto. Such residues and other elements considered as part of the copolymer composition are typically mixed or co-mingled with the copolymer such that they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

The terms "donor monomer" and "acceptor monomer" are used throughout this application. With regard to the present invention, the term "donor monomer" refers to monomers that have a polymerizable ethylenically unsaturated group that has relatively high electron density in the ethylenic double bond, and the term "acceptor monomer" refers to monomers that have a polymerizable ethylenically unsaturated group that has relatively low electron density in the ethylenic double bond. This concept has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309–319 (1999)). All e values recited herein are those appearing in the Polymer Handbook unless otherwise indicated.

In the Q-e scheme, Q reflects the reactivity of a monomer and e represents the polarity of a monomer, which indicates the electron density of a given monomer's polymerizable ethylenically unsaturated group. A positive value for e indicates that a monomer has a relatively low electron density and is an acceptor monomer, as is the case for maleic anhydride, which has an e value of 3.69. A low or negative value for e indicates that a monomer has a relatively high electron density and is a donor monomer, as is the case for vinyl ethyl ether, which has an e value of −1.80.

As referred to herein, a "strong acceptor monomer" is meant to include those monomers with an e value greater than 2.0. The term "mild acceptor monomer" is meant to include those monomers with an e value greater than 0.5 up to and including those monomers with an e value of 2.0. Conversely, the term "strong donor monomer" is meant to include those monomers with an e value of less than −1.5, and the term "mild donor monomer" is meant to include those monomers with an e value of less than 0.5 to those with an e value of −1.5.

In the copolymer of component (c) at least 30 mol %, in many cases at least 40 mol %, typically at least 50 mol %, in some cases at least 60 mol %, and in other cases at least 75 mol % of residues of the copolymer are derived from alternating sequences of donor monomer—acceptor monomer pairs, having the alternating monomer residue units of structure:

where DM represents a residue from a donor monomer and AM represents a residue from an acceptor monomer. The copolymer may be a 100% alternating copolymer of DM and AM. More particularly, at least 15 mol % of the copolymer comprises a donor monomer having the following structure (I):

where $R^1$ is linear or branched $C_1$ to $C_4$ alkyl, $R^2$ is one or more of methyl, linear, cyclic or branched $C_1$ to $C_{20}$ alkyl, alkenyl, aryl, alkaryl or aralkyl. Further, in a particular embodiment, at least 15 mol % of the copolymer includes an acrylic monomer as an acceptor monomer.

The copolymer incorporates a substantial portion of alternating residues of a mild donor monomer as described by structure I and a mild acceptor monomer, which is an acrylic monomer. A non-limiting list of published e values for monomers that may be included as monomers described by structure I and acrylic monomers are shown in Table 2.

TABLE 2

Alfrey-Price e values for Selected Monomers

| Monomer | e value |
| --- | --- |
| Monomers of structure 1 | |
| Isobutylene | −1.20[1] |
| Diisobutylene | 0.49[2] |

TABLE 2-continued

Alfrey-Price e values for Selected Monomers

| Monomer | e value |
|---|---|
| Acrylic Monomers | |
| Acrylic acid | 0.88[1] |
| Acrylamide | 0.54[1] |
| Acrylonitrile | 1.23[1] |
| Methyl acrylate | 0.64[1] |
| Ethyl acrylate | 0.55[1] |
| Butyl acrylate | 0.85[1] |
| Benzyl acrylate | 1.13[1] |
| Glycidyl acrylate | 1.28[1] |

[1] Polymer Handbook, Fourth Edition (1999)
[2] Rzaev et al., Eur. Polym. J., Vol. 24, No. 7, pp. 981–985 (1998)

In a particular embodiment, the copolymer component (c) is substantially free of maleate monomer residues and fumarate monomer residues, which typically have e values greater than 2.0. These types of multifunctional monomers provide too many functional groups to the copolymer. This can create problems, for example, in coatings where a thermosetting composition may have a short shelf life due to the overly functional nature of the copolymer.

Further, the present copolymer component (c) is typically substantially free of transition metals and Lewis acids, which, as noted above, have been used in the prior art to make alternating copolymers of mild donor monomers and mild acceptor monomers. The present invention does not utilize transition metal or Lewis acid adjuncts in preparing the copolymer (c), therefore, they do not need to be removed after polymerization and the resulting copolymer compositions will not suffer the drawbacks inherent in those that contain transition metals or Lewis acids.

Any suitable donor monomer may be used to prepare the copolymer (c) used in the film-forming composition of the present invention. Suitable donor monomers that may be used include strong donor monomers and, more often, mild donor monomers. The present copolymers will include a mild donor monomer described by structure I, such as isobutylene, diisobutylene, dipentene, and isoprenol, and may additionally include other suitable mild donor monomers. The donor monomer of structure I may have functional groups. For example, the group $R^2$ of the donor monomer of structure I may include one or more functional groups, such as hydroxy, epoxy, carboxylic acid, ether, carbamate, and amide.

The mild donor monomer of structure I is present in the copolymer composition at a level of at least 15 mol %, in some cases at least 25 mol %, typically at least 30 mol %, and, in some cases, at least 35 mol %. The mild donor monomer of structure I is present in the copolymer composition at a level of up to 50 mol %, in some cases up to 47.5 mol %, typically up to 45 mol %, and, in some cases, up to 40 mol %. The level of the mild donor monomer of structure I used is determined by the properties that are to be incorporated into the copolymer composition. Residues from the mild donor monomer of structure I may be present in the copolymer composition in any range of values inclusive of those stated above.

Suitable other donor monomers that may be used in the copolymer of component (c) include, but are not limited to, ethylene, butene, styrene, substituted styrenes, methyl styrene, vinyl ethers, vinyl esters, vinyl pyridines, divinyl benzene, vinyl naphthalene, and divinyl naphthalene. Vinyl esters include vinyl esters of carboxylic acids, which include, but are not limited to, vinyl acetate, vinyl butyrate, vinyl 3,4dimethoxybenzoate, and vinyl benzoate. The use of other donor monomers is optional, when other donor monomers are present, they are present at a level of at least 0.01 mol % of the copolymer composition, often at least 0.1 mol %, typically at least 1 mol %, and, in some cases, at least 2 mol %. The other donor monomers may be present at up to 25 mol %, in some cases up to 20 mol %, typically up to 10 mol %, and, in some cases, up to 5 mol %. The level of other donor monomers used is determined by the properties that are to be incorporated into the copolymer composition. Residues from the other donor monomers may be present in the copolymer composition in any range of values inclusive of those stated above.

The copolymer (c) includes acceptor monomers as part of the alternating donor monomer—acceptor monomer units along the copolymer chain. Any suitable acceptor monomer may be used. It is to be understood that acceptor monomers as used in the preparation of the copolymer are not to be construed as Lewis acids, the use of which as catalysts is undesirable in the present invention as discussed above. Suitable acceptor monomers include strong acceptor monomers and mild acceptor monomers. A non-limiting class of suitable acceptor monomers are those described by the structure (II):

where W is selected from the group consisting of —CN, —X, and —C(=O)—Y, wherein Y is selected from the group consisting of —NR$^3$$_2$, —O—R$^5$—O—C(=O)—NR$^3$$_2$, and —OR$^4$, R$^3$ is selected from the group consisting of H, linear or branched $C_1$ to $C_{20}$ alkyl, and linear or branched $C_1$ to $C_{20}$ alkylol, R$^4$ is selected from the group consisting of H, poly(ethylene oxide), poly(propylene oxide), linear or branched $C_1$ to $C_{20}$ alkyl, alkylol, aryl, alkaryl and aralkyl, linear or branched $C_1$ to $C_{20}$ fluoroalkyl, fluoroaryl and fluoroaralkyl, a polysiloxane radical, R$^5$ is a divalent linear or branched $C_1$ to $C_{20}$ alkyl linking group, and X is a halide.

A class of mild acceptor monomers that are included in the copolymer composition are acrylic acceptor monomers. Suitable acrylic acceptor monomers include those described by structure (III):

where Y is selected from the group consisting of —NR$^3$$_2$, —O—R$^5$—O—C(=O)—NR$^3$$_2$, and —OR$^4$, R$^3$ is selected from the group consisting of H, linear or branched $C_1$ to $C_{20}$ alkyl, and linear or branched $C_1$ to $C_{20}$ alkylol, R$^4$ is selected from the group consisting of H, poly(ethylene oxide), poly (propylene oxide), linear or branched $C_1$ to $C_{20}$ alkyl, alkylol, aryl and aralkyl, linear or branched $C_1$ to $C_{20}$ fluoroalkyl, fluoroaryl and fluoroaralkyl, a polysiloxane radical, and R$^5$ is a divalent linear or branched $C_1$ to $C_{20}$ alkyl linking group. A particularly useful type of acrylic acceptor monomers are those described by structure III where Y includes at least one functional group selected from hydroxy, amide, oxazoline, aceto acetate, blocked isocyanate, carbamate, and amine. Y groups may be converted to salt groups selected from carboxylic acid salt, amine salt, quaternized ammonium, quaternized phosphonium and ternary sulfonium.

Examples of suitable acceptor monomers that may be used in component (c) of the present invention include, but are not limited to, hydroxyethyl acrylate, hydroxypropyl acrylate, 4-hydroxybutyl acrylate, acrylic acid, methyl acrylate, ethyl acrylate, butyl acrylate, isobutyl acrylate, isobornyl acrylate, glycidyl acrylate, dimethylaminoethyl acrylate, acrylamide, perfluoro methyl ethyl acrylate, perfluoro ethyl acrylate, perfluoro butyl ethyl acrylate, trifluoromethyl benzyl acrylate, perfluoro alkyl ethyl, acryloxyalkyl terminated polydimethylsiloxane, acryloxyalkyl tris (trimethylsiloxy silane), acryloxyalkyl trimethylsiloxy terminated polyethylene oxide, chlorotrifluoro ethylene, glycidyl acrylate, 2-ethylhexyl acrylate, and n-butoxy methyl acrylamide.

The acrylic acceptor monomers of structure III are typically present in the copolymer composition at a level of at least 15 mol %, in some cases at least 25 mol %, often at least 30 mol %, and, in some cases, at least 35 mol %. The acrylic acceptor monomers of structure III are present in the copolymer composition at a level of up to 50 mol %, in some cases up to 47.5 mol %, often up to 45 mol %, and, in some cases, up to 40 mol %. The level of the acrylic acceptor monomers of structure III used is determined by the properties that are to be incorporated into the copolymer composition. Residues from the acrylic acceptor monomers of structure III may be present in the copolymer composition in any range of values inclusive of those stated above.

Suitable other mild acceptor monomers that may be used in component (c) of the present invention include, but are not limited to, acrylonitrile, methacrylonitrile, vinyl halides, crotonic acid, vinyl alkyl sulfonates, and acrolein. Vinyl halides include, but are not limited to, vinyl chloride and vinylidene fluoride. The use of other mild acceptor monomers is optional, when other mild acceptor monomers are present, they are present at a level of at least 0.01 mol % of the copolymer composition, often at least 0.1 mol %, typically at least 1 mol %, and, in some cases, at least 2 mol %. The other acceptor monomers may be present at up to 35 mol %, in some cases up to 25 mol %, typically up to 15 mol %, and, in some cases, up to 10 mol %. The level of other acceptor monomers used is determined by the properties that are to be incorporated into the copolymer composition. Residues from the other acceptor monomers may be present in the copolymer composition in any range of values inclusive of those stated above.

The copolymer (c) has a molecular weight of at least 250, in many cases at least 500, typically at least 1,000, and, in some cases, at least 2,000. The copolymer may have a molecular weight of up to 1,000,000, in many cases up to 500,000, typically up to 100,000, and, in some cases, up to 50,000. Certain applications will require that the molecular weight of the present copolymer not exceed 25,000, in some cases not to exceed 20,000, and, in certain instances not to exceed 16,000. The molecular weight of the copolymer is selected based on the properties that are to be incorporated into the copolymer composition. The molecular weight of the copolymer may vary in any range of values inclusive of those stated above.

The polydispersity index (PDI) of the copolymer is not always critical. The polydispersity index of the copolymer is usually less than 4, in many cases less than 3.5, typically less than 3.0, and, in some cases, less than 2.5. As used herein and in the claims, "polydispersity index" is determined from the following equation: (weight average molecular weight (Mw)/number average molecular weight (Mn)). A monodisperse polymer has a PDI of 1.0. Further, as used herein, Mn and Mw are determined from gel permeation chromatography using polystyrene standards.

In an embodiment of the present copolymer composition, the alternating sequences of donor monomer—acceptor monomer pairs are residues having the alternating structure IV:

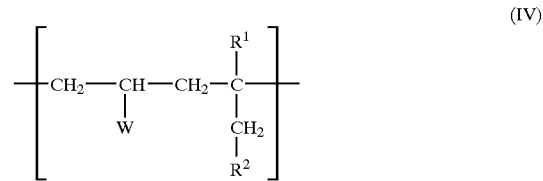

where $R^1$, $R^2$, and W are defined as above. A particularly preferred embodiment is one wherein the monomer residues containing the group W are derived from one or more acrylic monomers and the monomer residues containing the groups $R^1$ and $R^2$ are derived from diisobutylene and/or isobutylene. The copolymer compositions used in the film-forming composition of the present invention may also include other polymerizable ethylenically unsaturated monomers.

The copolymer composition may have all of the incorporated monomer residues in an alternating architecture. A non-limiting example of a copolymer segment having 100% alternating architecture of diisobutylene (DIIB) and an acrylic monomer (Ac) is shown by structure V:

-Ac-DIIB-Ac-DIIB-Ac-DIIB-Ac-DIIB-Ac-DIIB-Ac-DIIB-Ac-  (V)

However, in most instances, the copolymer will contain alternating segments and random segments as shown by structure VI, a copolymer of DIIB, Ac and other monomers, M:

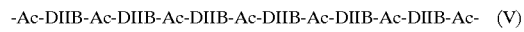
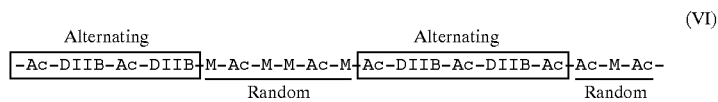

Structure VI shows an embodiment where the copolymer may include alternating segments as shown in the boxes and random segments as shown by the underlined segments.

The random segments of the copolymer may contain donor or acceptor monomer residues that have not been incorporated into the copolymer composition by way of an alternating architecture. The random segments of the copolymer composition may further include residues from other ethylenically unsaturated monomers. As recited herein, all references to polymer segments derived from alternating sequences of donor monomer—acceptor monomer pairs are meant to include segments of monomer residues such as those shown by the boxes in structure VI.

The other ethylenically unsaturated monomers include any suitable monomer not traditionally categorized as being an acceptor monomer or a donor monomer.

The other ethylenically unsaturated monomers, residue M of structure VI, is derived from at least one ethylenically unsaturated radically polymerizable monomer. As used herein and in the claims, "ethylenically unsaturated radically polymerizable monomer" and like terms are meant to include vinyl monomers, allylic monomers, olefins, and other ethylenically unsaturated monomers that are radically polymerizable and not classified as donor monomers or acceptor monomers.

Classes of vinyl monomers from which M may be derived include, but are not limited to, monomer residues derived from monomers of the general formula VII:

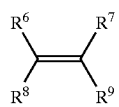

(VII)

where $R^6$, $R^7$, and $R^9$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl; $R^8$ is selected from the group consisting of H, $C_1$ to $C_6$ alkyl, and $COOR^{15}$, wherein $R^{15}$ is selected from the group consisting of H, an alkali metal, a $C_1$ to $C_6$ alkyl group, glycidyl, and aryl.

Specific examples of alkyl methacrylates having from 1 to 20 carbon atoms in the alkyl group from which residue M may be derived include, but are not limited to, methyl methacrylate, ethyl methacrylate, n-propyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate, as well as functional methacrylates, such as hydroxyalkyl methacrylates, oxirane functional methacrylates, and carboxylic acid functional methacrylates.

Residue M may also be selected from monomers having more than one methacrylate group, for example, methacrylic anhydride and diethyleneglycol bis(methacrylate).

As used herein and in the claims, by "allylic monomer(s)" what is meant is monomers containing substituted and/or unsubstituted allylic functionality, i.e., one or more radicals represented by the following general formula VII, $$H_2C=C(R^{10})-CH_2-$$ (VIII)

where $R^{10}$ is hydrogen, halogen, or a $C_1$ to $C_4$ alkyl group. Most commonly, $R^{10}$ is hydrogen or methyl and consequently general formula VII represents the unsubstituted (meth)allyl radical, which encompasses both allyl and methallyl radicals. Examples of allylic monomers include, but are not limited to, (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate, and (meth)allyl benzoate.

The copolymer composition used as component (c) in the film-forming composition of the present invention is prepared by a method including the steps of (a) providing a donor monomer composition comprising one or more donor monomers of structure (I), and (b) adding an ethylenically unsaturated monomer composition comprising one or more acceptor monomers. In an embodiment of the present invention, the ethylenically unsaturated monomer composition includes monomers of structure III. The ethylenically unsaturated monomer composition is added to the donor monomer composition in the presence of a free radical polymerization initiator in a suitable reaction vessel. The monomer solutions and resulting copolymer composition are preferably substantially free of maleate-type monomers, fumarate-type monomers, Lewis acids, and transition metals.

In an embodiment of the present method, the monomer of structure I is present at a molar excess based on the amount of acrylic acceptor monomer. Any amount of excess monomer of structure I may be used in the present invention in order to encourage the formation of the desired alternating architecture. The excess amount of monomer of structure I may be at least 10 mol %, in some cases up to 25 mol %, typically up to 50 mol %, and, in some cases, up to 100 mol % based on the amount of acrylic acceptor monomer. When the molar excess of monomer of structure I is too high, the process may not be economical on a commercial scale.

In a further embodiment of the present invention, the acrylic acceptor monomer is present in the copolymer in an amount of at least 15 mol %, in some cases 17.5 mol %, typically at least 20 mol % and, in some cases, 25 mol % of the total of the combined donor monomer composition and the ethylenically unsaturated monomer composition. The acrylic acceptor monomer may further be present in an amount up to 50 mol %, in some cases up to 47.5 mol %, typically up to 45 mol %, and, in some cases, up to 40 mol % of the total of the combined donor monomer composition and the ethylenically unsaturated monomer composition. The level of the acrylic acceptor monomers used is determined by the properties that are to be incorporated into the copolymer composition. The acrylic acceptor monomers may be present in the monomer composition in any range of values inclusive of those stated above.

The ethylenically unsaturated monomer composition of the present method may include other donor monomers as described above, as well as other monomers designated by M and described above. The use of other mild acceptor monomers is optional in the present method. When other mild acceptor monomers are present, they are present at a level of at least 0.01 mol % of the copolymer composition, often at least 0.1 mol %, typically at least 1 mol %, and, in some cases, at least 2 mol %. The other acceptor monomers may be present at up to 35 mol %, in some cases up to 25 mol %, typically up to 15 mol %, and, in some cases, up to 10 mol %. The level of other acceptor monomers used herein is determined by the properties that are to be incorporated into the copolymer composition. Residues from the other acceptor monomers may be present in the copolymer composition in any range of values inclusive of those stated above.

The use of other monomers, M, is optional. When other monomers are present, they are present at a level of at least 0.01 mol % of the copolymer composition, often at least 0.1 mol %, typically at least 1 mol %, and, in some cases, at least 2 mol %. The other monomers may be present at up to 35 mol %, in some cases up to 25 mol %, typically up to 15 mol %, and, in some cases, up to 10 mol %. The level of other monomers used herein is determined by the properties that are to be incorporated into the copolymer composition. Residues from the other monomers, M, may be present in the copolymer composition in any range of values inclusive of those stated above.

In an embodiment of the present invention, an excess of monomer of structure I is used and the unreacted monomer of structure I is removed from the resulting copolymer composition by evaporation. The removal of unreacted monomer is typically facilitated by the application of a vacuum to the reaction vessel.

Any suitable free radical initiator may be used to prepare the copolymer (c). Examples of suitable free radical initiators include, but are not limited to, thermal free radical initiators, photo-initiators, and redox initiators. Examples of suitable thermal free radical initiators include, but are not limited to, peroxide compounds, azo compounds, and persulfate compounds.

Examples of suitable peroxide compound initiators include, but are not limited to, hydrogen peroxide, methyl ethyl ketone peroxides, benzoyl peroxides, di-t-butyl peroxide, di-t-amyl peroxide, dicumyl peroxide, diacyl peroxides, decanoyl peroxides, lauroyl peroxides, peroxydicarbonates, peroxyesters, dialkyl peroxides, hydroperoxides, peroxyketals, and mixtures thereof.

Examples of suitable azo compounds include, but are not limited to, 4,4'-azobis(4-cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis (valeronitrile), 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride, and 2-(carbamoylazo)-isobutyronitrile.

In the preparation of copolymer (c), the ethylenically unsaturated monomer composition and the free radical polymerization initiator are separately and simultaneously added to and mixed with the donor monomer composition. The ethylenically unsaturated monomer composition and the free radical polymerization initiator may be added to the donor monomer composition over a period of at least 15 minutes, in some cases at least 20 minutes, typically at least 30 minutes, and, in some cases, at least 1 hour. The ethylenically unsaturated monomer composition and the free radical polymerization initiator may further be added to the donor monomer composition over a period of up to 24 hours, in some cases up to 18 hours, typically up to 12 hours, and, in some cases, up to 8 hours. The time for adding the ethylenically unsaturated monomer must be sufficient to maintain a suitable excess of donor monomer of structure I over unreacted acrylic acceptor monomer to encourage the formation of donor monomer—acceptor monomer alternating segments. The addition time is not so long as to render the process economically unfeasible on a commercial scale. The addition time may vary in any range of values inclusive of those stated above.

After mixing or during addition and mixing, polymerization of the monomers takes place. The polymerization-method can be run at any suitable temperature. Suitable temperature for the polymerization may be ambient, at least 50° C., in many cases at least 60° C., typically at least 75° C., and, in some cases, at least 100° C. Suitable temperature may further be described as being up to 300° C., in many cases up to 275° C., typically up to 250° C., and, in some cases, up to 225° C. The temperature is typically high enough to encourage good reactivity from the monomers and initiators employed. However, the volatility of the monomers and corresponding partial pressures create a practical upper limit on temperature determined by the pressure rating of the reaction vessel. The polymerization temperature may vary in any range of values inclusive of those stated above.

The polymerization can be run at any suitable pressure. A suitable pressure for the present method may be ambient, at least 1 psi, in many cases at least 5 psi, typically at least 15 psi, and, in some cases, at least 20 psi. Suitable pressures for the polymerization may further be described as being up to 200 psi, in many cases up to 175 psi, typically up to 150 psi, and, in some cases, up to 125 psi. The pressure is typically high enough to maintain the monomers and initiators in a liquid phase. The pressures employed have a practical upper limit based on the pressure rating of the reaction vessel employed. The pressure during polymerization temperature may vary in any range of values inclusive of those stated above.

The copolymer that results may be utilized as a starting material for the preparation of other polymers by using functional group transformations by methods known in the art. Functional groups that can be introduced by these methods include carboxylic acid, carboxylate salt, amine, amine salt, quaternized ammonium, sulfonium salt, phosphate salt, epoxy, hydroxy, amide, oxazoline, acetoacetate, isocyanate, carbamate, thioether, and sulfide.

For example, a copolymer comprising methyl acrylate will contain carbomethoxy groups. The carbomethoxy groups can be hydrolyzed to carboxyl groups or transesterified with an alcohol to form the corresponding ester of the alcohol. Using ammonia, the aforementioned methyl acrylate copolymer can be converted to an amide, or, using a primary or secondary amine, can be converted to the corresponding N-substituted amide. Similarly, using a diamine such as ethylene diamine, one can convert the aforementioned copolymer of the present method to an N-aminoethylamide, or, with ethanolamine, to an N-hydroxyethylamide. The N-aminoethylamide functionality can be further converted to an oxazoline by dehydration. The N-aminoethylamide can be further reacted with a carbonate, such as propylene carbonate, to produce the corresponding urethane functional copolymer. These transformations can be carried out to convert all of the carbomethoxy groups or can be carried out in part, leaving some of the carbomethoxy groups intact.

Epoxy groups can be introduced into the copolymer (c) directly by using glycidyl acrylate in the copolymer preparation or indirectly by functional group transformation. One example of an indirect method is to oxidize residual unsaturation in the copolymer to epoxy groups using a peracid such as peroxyacetic acid. Alternatively, one can prepare a carboxyl-functional copolymer by hydrolysis as described above, treat the carboxyl-functional copolymer with epichlorohydrin, then alkali, to produce the epoxy functional copolymer. These transformations can also be carried out exhaustively or in part. The resulting epoxy-functional copolymer can be further reacted with the appropriate active hydrogen-containing reagents to form alcohols, amines or sulfides.

Hydroxyl groups can be introduced directly using a hydroxyl-functional monomer, such as hydroxyethyl acrylate, in the copolymer, or they can be introduced by functional group transformation. By treating the carboxyl-functional copolymer described above with an epoxy, one can produce a hydroxyl functional polymer. Suitable epoxies include, but are not limited to, ethylene oxide, propylene oxide, butylene oxide, and glycidyl neodecanoate.

Hydroxyl functional monomers are particularly preferred in the preparation of the copolymer. Though not intending to be bound by any theory, it is believed that hydroxyl functionality in the copolymer, particularly primary hydroxyl functionality, contributes to the sag control and improved levelling exhibited by the curable film-forming composition of the present invention upon application to a substrate.

The above-described hydroxyl functional copolymers can be further reacted to form other copolymers. For example, a copolymer containing hydroxyethyl groups can be treated with a carbamoylating agent, such as methyl carbamate, to produce the corresponding carbamate functional copolymer. With diketene or t-butyl acetoacetate, the hydroxyl groups can also be converted to acetoacetate esters.

Isocyanate functional copolymers can also be produced. Copolymers that contain two or more hydroxyl groups can be treated with a diisocyanate, such as isophorone diisocyanate, to produce isocyanate-functional polymers. Primary amine functional copolymers, described above, can be phosgenated to produce isocyanate functionality.

Ionic functionality can be incorporated into the copolymer (c) by any means known in the art. Carboxylate groups can be introduced by hydrolysis of ester groups in the copolymer followed by reaction with base. Amine salts can be introduced by preparing the present copolymer with an amine functional acrylate, such as dimethylaminoethyl acrylate, followed by protonation of the amino groups with an acid. Amine salts can also be introduced by reacting a glycidyl functional copolymer with ammonia or an active hydrogen-containing amine followed by protonation with acid. Quaternary ammonium functional groups or ternary sulfonium groups can be introduced into the copolymer by treating an epoxy functional copolymer of the present method with a tertiary amine or sulfide, respectively, in the presence of a protic acid.

Generally, the copolymer (c) is present in an amount ranging from about 0.5 to about 10 weight percent based on the total weight of resin solids in the film-forming composition, typically about 1 to about 10 weight percent and, more often, about 2.5 to about 10 weight percent.

The curable compositions of the present invention may optionally contain additives, such as waxes, to improve the slip properties of the cured coating, degassing additives, such as benzoin, adjuvant resin to modify and optimize coating properties, antioxidants and ultraviolet (UV) light absorbers. Examples of useful antioxidants and UV light absorbers include those available commercially from Ciba Specialty Chemicals under the trade names IRGANOX and TINUVIN. These optional additives, when used, are typically present in amounts up to 20 percent by weight, based on total weight of resin solids of the curable composition.

Not wishing to be limited to any one set of functional groups, there are several examples of co-reactive functional groups that can be used in the curable film-forming composition of the present invention. The functional groups of the first component (a) can be, but are not limited to, epoxy or oxirane, carboxylic acid, hydroxy, amide, oxazoline, aceto acetate, isocyanate, methylol, methylol ether, or carbamate. The crosslinking component (b) has at least two functional groups that are co-reactve toward the functional groups of the first reactant and can be, but are not limited to, epoxy or oxirane, carboxylic acid, hydroxy, isocyanate, capped isocyanate, amine, methylol, methylol ether, and beta-hydroxyalkylamide.

The film-forming composition of the present invention is preferably used as the clear coat layer in a multi-component composite coating composition, such as a "color-plus-clear" coating system, which includes at least one pigmented or colored base coat and at least one clear topcoat. In this embodiment, the clear film-forming composition may include the aqueous composition of the present invention.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes. Polymers prepared using atom transfer radical polymerization may also be used as resinous binders in the base coat.

The base coat compositions may be solvent borne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

The base coat contains pigments to give it color. Suitable pigments include those discussed above. In general, the pigment is incorporated into the coating composition in amounts of about 1 to 80 percent by weight based on weight of coating solids. Metallic pigment is employed in amounts of about 0.5 to 25 percent by weight based on weight of coating solids.

If desired, the base coat composition may contain additional materials well known in the art of formulated surface coatings, including those discussed above. These materials can constitute up to 40 percent by weight of the total weight of the coating composition.

The base coating compositions can be applied to various substrates to which they adhere by conventional means, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to 5 mils (0.254 to 127 microns), preferably 0.1 to 2 mils (2.54 to 50.8 microns) in thickness.

After application of the base coat to the substrate, a film is formed on the surface of the substrate by driving solvent out of the base coat film by heating or by an air drying period sufficient to ensure that the clear coat can be applied to the base coat without the former dissolving the base coat composition, yet insufficient to fully cure the base coat. More than one base coat and multiple clear coats may be applied to develop the optimum appearance. Usually between coats, the previously applied coat is flashed.

The clear topcoat composition may be applied to the base coated substrate by any conventional coating technique, such as brushing, spraying, dipping or flowing, but spray applications are preferred because of superior gloss. Any of the known spraying techniques may be employed, such as compressed air spraying, electrostatic spraying, and either manual or automatic methods.

After application of the clear coat composition to the base coat, the coated substrate may be heated to cure the coating layer(s). In the curing operation, solvents are driven off and the film-forming materials in the composition are crosslinked. The heating or curing operation is usually carried out at a temperature in the range of from at least ambient (in the case of free polyisocyanate crosslinking agents) to 350° F. (ambient to 177° C.) but, if needed, lower or higher temperatures may be used as necessary to activate crosslinking mechanisms.

The aqueous film-forming composition of the present invention demonstrates improved sag resistance when applied to vertically oriented substrates and improved pop resistance compared to conventional film-forming compositions that do not contain the copolymer of component (c).

The present invention is more particularly described in the following examples, which are intended to be illustrative only, since numerous modifications and variations therein will be apparent to those skilled in the art. Unless otherwise specified, all parts and percentages are by weight.

EXAMPLES A AND B

Examples A and B illustrate the preparation of copolymers containing isobutylene or diisobutylene in accordance with the present invention. Reactants were combined as described below:

|  |  | Example No. | A | B |
|---|---|---|---|---|
| Charge #1 | Isobutyl Alcohol | | 0 | 500 g |
|  | Isobutylene | | 0 | 550 g |
|  | Diisobutylene | | 1000 g | 0 |
| Charge #2 | Di-t-Amyl Peroxide | | 60 | 50 |
|  | Diisobutylene | | 120 | 0 |
| Charge #3 | Butyl Acrylate | | 1200 | 1200 |
|  | Acrylic Acid | | 80 | 80 |
|  | Hydroxyethyl Acrylate | | 720 | 720 |
| % Solids |  | | 83% | 83 wt. % |
| GPC | Mw | | 8317 | 12856 |
|  | Mn | | 2293 | 4274 |
|  | Mw/Mn | | 3.6 | 3.00 |

To prepare the copolymer of Example A, Charge #1 was added to a reaction vessel equipped with an agitator, a thermocouple, and a nitrogen inlet. The vessel was sealed, the solution was placed under a nitrogen blanket and heated to 150° C. Charge #2 was added to the reaction vessel over 2.5 hours. Fifteen minutes after Charge #2 was initiated, Charge #3 and Charge #4 were started over a period of 2 hours. During the addition periods, the reactor temperature was maintained at 140 to 160° C. and pressures varied from 5 psi to 62 psi. After completion of Charge #2, the reaction mixture was held 2 hours at 150° C. The solids were determined by holding a sample at 110° C. for one hour and calculating weight loss. Molecular weight was determined by gel permeation chromatography using polystyrene standards, COOH equivalent weight was determined by titration with 0.1N methanoic KOH and found to be 2604 grams/COOH at processed solids.

To prepare the copolymer of Example B, Charge #1 was added to a reaction vessel equipped with an agitator, a thermocouple, and a nitrogen inlet. The vessel was sealed, the solution was placed under a nitrogen blanket and headed to 150° C. Charge #2 was added to the reaction vessel over 2.5 hours. Fifteen minutes after Charge #2 was initiated, Charge #3 and Charge #4 were started over a period of 2 hours. During the addition periods, the reactor temperature was maintained at 140 to 160° C. and pressures varied from 40 psi. After completion of Charge #2, the reaction mixture was held 2 hours at 140 to 160° C. The solids were determined by holding a sample at 110° C. for one hour and calculating weight loss. Molecular weight was determined by gel permeation chromatography using polystyrene standards, COOH equivalent weight was determined by titration with 0.1N methanoic KOH and found to be 2611 grams/COOH at processed solids.

EXAMPLE C

This example illustrates the preparation of an acrylic latex to be used as a resinous binder in curable film-forming compositions.

|  | WT. |
|---|---|
| CHARGE #1: TO ROUND BOTTOM FLASK | |
| Acrylic copolymer[1] | 288.37 |
| TrixeneDP 9B/1504 ®[2] | 37.25 |
| Methylisobutyl ketone | 6.69 |
| CHARGE #2: TO FLASK | |
| TINUVIN ® 400[3] | 6.34 |
| TINUVIN ® 123[4] | 2.17 |
| BYK ® 390[5] | 2.61 |
| POLYBUTYLACRYLATE[6] | 1.30 |
| DIBUTYLTINDILAURATE | 0.59 |
| DIMETHYL ETHANOLAMINE | 3.27 |
| SURFYNOL ® 2502[7] | 1.83 |
| CHARGE #3: TO AN ADDITION FUNNEL | |
| MIBK | 6.69 |
| CHARGE #4: TO 12 LITER FLASK | |
| DMEA | 0.82 |
| DEIONIZED WATER | 376.24 |
| CHARGE #5 | |
| DEIONIZED WATER | 12.45 |
|  | 746.61 |
| CHARGE #6: TO 12 L FLASK BEFORE VAC STRIP | |
| FOAM KILL ® 649[8] | 0.12 |
| CHARGE #7: TO FLASK AS NEEDED | |
| FOAM KILL ® 649 | 0.08 |

Notes:
[1]Copolymer prepared from hydroxyethyl methacrylate, 2-ethylhexyl acrylate, styrene, acrylic acid, CARDURA E (glycidyl esters of mixtures of tertiary aliphatic carboxylic acids, commercially available from Shell Chemical Company), in a 19.90:10.15:30.30:11.00:28.65 weight ratio, 64 percent solids by weight in methyl isobutyl ketone
[2]Isocyanurate of 1,6-hexamethylenediisocyanate blocked with 3,5-dimethyl pyrazole, at 70% solids in methyl isobutyl ketone, available from Baxenden Chemicals Limited, England.
[3]Available from Ciba-Geigy Corporation
[4]Sterically hindered tertiary amine light stabilizer available from Ciba Geigy Corporation
[5]Available from BYK Chemie USA
[6]Available as a 60% solids solution from DuPont
[7]Acetylenic alcohol surfactant available from Air Products and Chemicals Co.
[8]Aliphatic hydrocarbon, available from Crucible Chemical Charge #1 and #2 were added to a reaction flask in order and mixed until homogeneous. Charge #4 was heated separately to 25° C. at 350 rpm. The mixture of Charge #1 and #2 was added into Charge #4 over 1 hour. When addition was complete, Charge #3 was added as a rinse to the flask and the mixture held at least 30 minutes. The mixture was passed through a Microfluidizer® homogenizer (available from Microfluidics Corporation) at 11,500 psi with cooling water. Charge #5 followed as a rinse through the homogenizer and the entire mixture set up for total distillation. Charge #6 was then added to the batch under agitation (350 rpm). A nitrogen sweep was started, followed by vacuum at 450–550 mm Hg. The batch was heated to 40° C. increasing temperature as needed (max 600C). Vacuum was slowly increased as needed; >100 mm Hg, using $N_2$ to control foam. Deionized water was added as needed to adjust solids to 46.0+/−1.5%. The reaction product was cooled to <40° C., then filtered through a 5 micron jacketed) filter bag. The resulting dispersion had a resin solids content of about 46%, a pH of 8.7, and a particle size of about 1600 Angstroms.

EXAMPLES 1 TO 10

Examples 1 to 10 illustrate the preparation of curable film-forming compositions. Examples 1 and 6 are controls and contain no copolymers of isobutylene type monomers. Examples 2 to 5 illustrate the preparation of curable film-forming compositions using increasing levels of diisobutylene-containing copolymers in accordance with the present invention. Examples 7 to 10 illustrate the preparation of curable film-forming compositions using increasing levels of isobutylene-containing copolymers in accordance with the present invention.

Ingredients were combined as described below.

(Eiger mill) to achieve a Hegan value of 7+. In a second premix, 0.2 parts dodecylbenzenesulfonic acid was agitated while slowly adding dimethylethanolamine (50% in deionized water). In a third premix, 0.24 parts Borchi Gel® LW 44 w as stirred while adding deionized water until the premix was of uniform consistency.

The acrylic latex was placed under agitation and Dynol® 604 added. The mixture was allowed to stir to ensure full incorporation. The following were then added in order under moderate agitation: 2,2,4 trimethyl-1,3-pentanediol monoisobutyrate, isobutyl alcohol, isostearyl alcohol, and the copolymer of Example A. The mixture was again allowed to stir to ensure full incorporation. The following

| Example | Resin Solids % | 1 Control RS/TW* | 2 2.5% additive RS/TW | 3 5.0% additive RS/TW | 4 7.5% additive RS/TW | 5 10% additive RS/TW |
|---|---|---|---|---|---|---|
| Acrylic latex of Example C[1] | 44.5 | 80/179.8 | — | — | — | — |
| Acrylic latex of Example C[2] | 49.0 | — | 77.5/158.2 | 75/153.1 | 72.5/147.9 | 70/142.9 |
| Copolymer of Example A | 83.2 | — | 2.5/3.0 | 5.0/6.0 | 7.5/9.0 | 10/12.0 |
| Dynol® 604 Surfactant[3] | 100 | 0.5 | 0.5 | 0.5 | 0.5 | 0.5 |
| 2,2,4 Trimethyl-1,3-Pentanediol Monoisobutyrate | | 6 | 6 | 6 | 6 | 6.0 |
| Isobutanol | | 8 | 8 | 8 | 8 | 8.0 |
| Isostearyl Alcohol | | 2.0 | 2.0 | 2.0 | 2.0 | 2.0 |
| Cymel® 327[4]/Aerosil® 200[5] | 90 | 20.4/22.6 | 20.4/22.6 | 20.4/22.6 | 20.4/22.6 | 20.4/22.6 |
| DDBSA/DMEA | 37 | 0.2/0.542 | 0.2/0.542 | 0.2/0.542 | 0.2/0.542 | 0.2/0.542 |
| Borchi-gel® LW44 Thickener[6] | 22 | 1.2 | 2 | 2 | 3 | 3.5 |
| Water | | — | 18.74 | 21 | 24 | 26.1 |
| Viscosity, sec.[7] | | 30.0 | 30.0 | 29.0 | 31.0 | 32.0 |

*RS/TW: The first number reported is the resin solid weight of the ingredient added to the formulation; the second number reported is the total weight of the ingredient added to the formulation.
[1,2]Acrylic Latex: Aqueous acrylic resin prepared as in Example C, with solids contents of 44.5 percent by weight and 49.0 percent by weight, respectively.
[3]Dynol® 604: ethoxylated acetylenic diol available from Air Products and Chemicals, Inc.
[4]Cymel® 327: Highly methylated, high imino content melamine formaldehyde resin in isobutanol available from available from Cytec Industries, Inc.
[5]Aerosil® 200 fumed silica available from Degussa Corporation
[6]Borchi Gel® LW 44 available from Borchers
[7]Viscosity measured using #4 DIN cup In a first premix, Cymel® 327 was stirred and Aerosil® 200 added in a 90:10 ratio (Cymel® 327: Aerosil® 200). The mixture was then mixed in a pigment dispersion mill ingredients were then added separately with stirring after each addition: deionized water, premix 1, and premix 2. Premix 3 was used to adjust viscosity.

| Example | Resin Solids % | 6 Control RS/TW | 7 2.5% additive RS/TW | 8 5.0% additive RS/TW | 9 7.5% additive RS/TW | 10 10% additive RS/TW |
|---|---|---|---|---|---|---|
| Acrylic latex of Example C | 44.5 | 80/179.8 | — | — | — | — |
| Acrylic latex of Example C | 49.0 | — | 77.5/158.2 | 75/153.1 | 72.5/147.9 | 70/142.9 |
| Copolymer of Example B | 83.2 | — | 2.5/3.0 | 5.0/6.0 | 7.5/9.0 | 10/12.0 |

-continued

| Example | Resin Solids % | 6 Control RS/TW | 7 2.5% additive RS/TW | 8 5.0% additive RS/TW | 9 7.5% additive RS/TW | 10 10% additive RS/TW |
|---|---|---|---|---|---|---|
| Dynol ® 604 Surfactant | 100 | 0.5 | 0.5 | 0.5 | 0.5 | 0.5 |
| 2,2,4 Trimethyl-1, 3-Pentanediol Monoisobutyrate | | 6 | 6 | 6 | 6 | 6.0 |
| Isobutanol | | 8 | 8 | 8 | 8 | 8.0 |
| Isostearyl Alcohol | | 2.0 | 2.0 | 2.0 | 2.0 | 2.0 |
| Cymel ® 327/Aerosil ® 200 | 90 | 20.4/22.6 | 20.4/22.6 | 20.4/22.6 | 20.4/22.6 | 20.4/22.6 |
| DDBSA/DMEA | 37 | 0.2/0.542 | 0.2/0.542 | 0.2/0.542 | 0.2/0.542 | 0.2/0.542 |
| Borchi-gel ® LW44 Thickener | 22 | 1.2 | 2 | 2 | 3 | 3.5 |
| Water | | — | 18.74 | 21 | 24 | 26.1 |
| Viscosity, sec. | | 30.0 | 30.0 | 29.0 | 31.0 | 32.0 |

The film-forming compositions of Examples 1–10 were applied over two separate sets of primed and base coated steel substrate panels for property testing. The primers used on the substrate are commercially available from PPG Industries, Inc. and are identified as 1177225AR and GPX05379. In one set of panels, the base coat used on the substrate is commercially available from PPG Industries, Inc. and is identified as EWB Silver. In a second set of panels, the base coat used on the substrate is commercially available from PPG Industries, Inc. and is identified as EWB Black. The film-forming compositions of Examples 1–10 were spray applied in two coats to the steel panels at a temperature of about 75° F. (24° C.). Approximately a 90 second flash time was allowed between the two coats. The resulting coating was then allowed to air flash at 75° F. (24° C.) for 10 minutes before a two-stage bake to cure the film-forming compositions. The first stage was a ten-minute bake at 176° F. (80° C.) and the second-stage bake was a 22-minute bake at 293° F. (145° C).

Appearance and physical properties of the coated panels were measured as described in the following tests. DOI (distinction of image) was measured using a Dorigon II® DOI meter from Hunter Lab. Specular gloss at 20° and haze were measured by a BYK Gardner® Haze-Gloss Meter. Higher gloss and DOI numbers denote better performance. Higher haze values denote greater degree of haziness or lack of clarity. The smoothness of the clear coats was measured using a Byk Wavescan Plus® instrument in which results are reported as long wave and short wave numbers and tension values. Lower long wave and short wave numbers denote smoother films. Higher tension values also denote smoother films. Hardness was determined in accordance with ASTM D 2134.

Lightness (L) was determined using a MacBeth Color Eye ® 3000 Spectrophotometer, available from the Macbeth division of Kollmorgen Instruments. Lightness measurements were taken before and after humidity testing and the difference (dL) also recorded. A dL value closer to zero (positive or negative) indicates better performance.

Spot testing is based upon the,Mercedes PBO 27971 Chemical Resistance Test Method. The tests use the BYK Gardner® Model 2615 Gradient Oven. This gradient oven has a temperature differential of 1° C. per element and a constant gradient greater than 36° C. After curing, coated steel test panels are allowed to condition at room temperature for at least 72 hours before testing.

Sulfuric Acid Spot Testing

A 1% solution of sulfuric acid is applied to the coated steel test panels as 25 microliter drops using a Multipipette 4780. These drops are applied with a one-centimeter distance between drops. This procedure allows for a temperature range of about 30° C. to 74° C. The test panels are exposed to the sulfuric acid drops for thirty minutes. Afterwards, the drops are rinsed away with cool water and carefully dried using a soft paper towel. The temperature at the first observable change on the test panel is recorded as the sulfuric acid spot resistance.

Water Spot Testing

De-ionized water is applied as 250 microliter drops using a Multipipette 4780. These drops are applied with a two-centimeter distance between drops. The initial water spot test is done with a 30° C. to 74° C. temperature range. If no damage is observed, then the test is repeated at a 60° C. to 104° C. range. The coated steel test panels are exposed to the water drops for thirty minutes. Afterwards, the drops are rinsed away with cool water and carefully dried using a soft paper towel. The temperature at the first observable change on the test panel is recorded as the water spot resistance.

Scratch (mar) resistance of coated test panels was measured using the following method: Initial 20° gloss of the coated panels was measured. Coated panels were subjected to scratch testing by linearly scratching the coated surface with a weighted abrasive paper for ten double rubs using an Atlas® AATCC Scratch Tester, Model CM-5, available from Atlas Electrical Devices Company of Chicago, Ill. The abrasive paper used was 3M 281Q WETORDRY™ PRODUCTIONυ 9-micron polishing paper sheets, which are commercially available from 3M Company of St. Paul, Minn. Panels were then rinsed with water and carefully patted dry. The 20° gloss was measured on the scratched area of each test panel. The number reported is the percent of the initial gloss retained after scratch testing, i.e., 100%× scratched gloss/initial gloss. Post-weathering scratch resistance (retained scratch resistance) was measured using the scratch test method described above after the unscratched test panels were subjected to simulated weathering by QUV® exposure to UVA-340 bulbs in a weathering cabinet available by Q Panel Co. Testing was as follows: a cycle of 70° C. for 8 hours followed by 50° C. for 4 hours (total exposure time of 100 hours). The number reported is the percent of the initial gloss retained after retained scratch testing, i.e., 100×retained scratched gloss/initial gloss.

Humidity resistance/cross hatch adhesion of the cured film to the substrate was determined after 240 hours in a constant humidity chamber operating at 100% relative humidity and 37.8° C. (100° F.) as defined in ASTM 3359-B. A rating of 100 means complete loss of adhesion and a rating of 0 means no loss of adhesion.

The test results for the cured compositions are shown in the following tables.

TABLE 1

| Example Description | 1 Control | 2 2.5% additive | 3 5% additive | 4 7.5% additive | 5 10% additive |
|---|---|---|---|---|---|
| Substrate: Primer | | | 1177225AR | | |
| Basecoat | | | EWB Silver | | |
| BC DFT, microns | 13 | 13 | 13 | 13 | 13 |
| CC DFT, microns | 43 | 42 | 39 | 39 | 37 |
| Initial 20° Gloss | 99 | 96 | 93 | 98 | 97 |
| Initial Haze | 289 | 295 | 318 | 312 | 313 |
| Initial DOI | 16 | 79 | 77 | 73 | 72 |
| Wave Scan LW | 4.1 | 3.5 | 2.2 | 2.9 | 2.5 |
| Wave Scan SW | 18.0 | 17.2 | 13.4 | 14.3 | 13.2 |
| Tension | 16.7 | 17.1 | 18.1 | 17.4 | 17.7 |
| Mar Resistance Initial Gloss | 99 | 96 | 93 | 98 | 97 |
| Mar Resistance Stripe 1 | 86 | 81 | 86 | 82 | 76 |
| Stripe 2 | 85 | 77 | 86 | 78 | 79 |
| % Gloss Retention | 86 | 82 | 92 | 82 | 80 |
| Koenig Hardness | 127 | 127 | 121 | 119 | 116 |
| Spot Test DIH$_2$O | 74 | 74 | 74 | 74 | 74 |
| Spot Test 1% Acid | 39–43 | 39 | 39–43 | 43 | 43 |
| Humidity (100%/37.8° C.) | | | | | |
| Final 20° Gloss | 96 | 94 | 92 | 91 | 92 |
| Final Haze | 165 | 145 | 186 | 218 | 235 |
| Final DOI | 69 | 65 | 63 | 56 | 50 |
| % Cross Hatch <1 hour | 0 | 0 | 0 | 0 | 0 |
| Initial L | −88.16 | −88.00 | −88.39 | −88.56 | −88.76 |
| Final L | −80.74 | −80.40 | −82.48 | −83.73 | −84.57 |
| dL(+Lighter)(−Darker) | −7.42 | −7.60 | −5.91 | −4.83 | −4.19 |

TABLE 2

| Example Description | 1 Control | 2 2.5% additive | 3 5% additive | 4 7.5% additive | 5 10% additive |
|---|---|---|---|---|---|
| Substrate Primer: | | | 1177225AR | | |
| Basecoat: | | | EWB Black | | |
| BC DFT | 11 | 11 | 11 | 11 | 11 |
| CC DFT | 43 | 42 | 39 | 39 | 37 |
| Initial 20° Gloss | 94 | 94 | 92 | 92 | 90 |
| Initial Haze | 14 | 14 | 18 | 17 | 18 |
| Initial DOI | 89 | 89 | 89 | 86 | 87 |
| Wave Scan LW | 4.5 | 3.2 | 4.5 | 4.2 | 4.1 |
| Wave Scan SW | 19.0 | 18.5 | 13.9 | 14.7 | 12.8 |
| Tension | 16.4 | 17.3 | 16.4 | 16.5 | 16.6 |
| Mar Resistance Initial Gloss | 94 | 94 | 92 | 92 | 90 |
| Mar Resistance Stripe 1 | 78 | 79 | 72 | 74 | 69 |
| Stripe 2 | 79 | 78 | 75 | 69 | 69 |
| % Gloss Retention | 84 | 84 | 80 | 78 | 77 |
| Koenig Hardness | 99 | 101 | 101 | 98 | 98 |
| Spot Test DIH$_2$O | 74 | 74 | 74 | 74 | 74 |
| Spot Test 1% Acid | 43 | 43 | 39 | 43 | 37–39 |
| Substrate: Primer: | | | GPX05379 | | |
| Basecoat: | | | EWB Black | | |
| Humidity (100%/37.8° C.) | | | | | |
| Final 20° Gloss | 93 | 91 | 90 | 89 | 89 |
| Final Haze | 14 | 13 | 16 | 16 | 15 |
| Final DOI | 85 | 85 | 84 | 82 | 80 |
| % Cross Hatch <1 hour | 0 | 0 | 0 | 0 | 0 |
| Initial L | −25.49 | −25.33 | −25.21 | −25.18 | −25.10 |
| Final L | −27.31 | −27.05 | −26.27 | −26.05 | −26.01 |
| dL(+Lighter)(−Darker) | 1.82 | 1.72 | 1.06 | 0.87 | 0.91 |

TABLE 3

| Example Description | 6 Control | 7 2.5% additive | 8 5% additive | 9 7.5% additive | 10 10% additive |
|---|---|---|---|---|---|
| Substrate Primer | | | 1177225AR | | |
| Basecoat | | | EWB Silver | | |
| BC DFT | 12 | 12 | 12 | 12 | 12 |
| CC DFT | 38 | 38 | 37 | 42 | 37 |
| Initial 20° Gloss | 100 | 100 | 100 | 100 | 99 |
| Initial Haze | 323 | 330 | 336 | 338 | 343 |
| Initial DOI | 77 | 76 | 75 | 80 | 75 |
| Wave Scan LW | 2.4 | 2.6 | 2.6 | 2.5 | 4.3 |
| Wave Scan SW | 15.9 | 15.1 | 15.8 | 16.5 | 22.7 |
| Tension | 17.9 | 17.7 | 17.7 | 17.8 | 17.1 |
| Mar Resistance Initial Gloss | 100 | 100 | 100 | 100 | 99 |
| Mar Resistance Stripe 1 | 84 | 88 | 85 | 86 | 86 |
| Stripe 2 | 80 | 81 | 83 | 88 | 88 |
| % Gloss Retention | 82 | 85 | 84 | 87 | 88 |
| Koenig Hardness | 115 | 113 | 115 | 108 | 106 |
| Spot Test DIH$_2$O | 74 | 74 | 74 | 74 | 74 |
| Spot Test 1% Acid | 48 | 51–55 | 48–51 | 43–48 | 48 |
| Substrate: Primer: | | | 1177225AR | | |
| Basecoat: | | | EWB Silver | | |
| Humidity (100%/37.8° C.) | | | | | |
| Final 20° Gloss | 96 | 94 | 96 | 95 | 95 |
| Final Haze | 201 | 194 | 218 | 199 | 229 |
| Final DOI | 71 | 68 | 72 | 75 | 70 |
| % Cross Hatch <1 hour | 0 | 0 | 0 | 0 | 0 |
| Initial L | −88.27 | −88.49 | −88.50 | −88.42 | −88.64 |
| Final L | −82.66 | −82.35 | −83.47 | −82.32 | −83.42 |
| dL(+Lighter)(−Darker) | −5.61 | −6.14 | −5.03 | −6.10 | −5.22 |

TABLE 4

| Example Description | 6 Control | 7 2.5% additive | 8 5% additive | 9 7.5% additive | 10 10% additive |
|---|---|---|---|---|---|
| Substrate: Primer | | | 1177225AR | | |
| Basecoat | | | EWB Black | | |
| BC DFT | 12 | 12 | 12 | 12 | 12 |
| CC DFT | 38 | 38 | 37 | 42 | 37 |
| Initial 20° Gloss | 93 | 93 | 93 | 93 | 92 |
| Initial Haze | 14 | 15 | 14 | 14 | 14 |
| Initial DOI | 84 | 88 | 86 | 90 | 89 |
| Wave Scan LW | 3.7 | 4.2 | 3.6 | 4.5 | 4.5 |
| Wave Scan SW | 16.0 | 14.3 | 14.3 | 16.4 | 15.1 |
| Tension | 16.9 | 16.4 | 16.9 | 16.4 | 16.3 |
| Mar Resistance Initial Gloss | 93 | 93 | 93 | 93 | 92 |
| Mar Resistance Stripe 1 | 80 | 79 | 82 | 74 | 80 |
| Stripe 2 | 77 | 82 | 78 | 77 | 76 |
| % Gloss Retention | 84 | 87 | 86 | 81 | 85 |
| Koenig Hardness | 94 | 90 | 95 | 84 | 86 |
| Spot Test DIH$_2$O | 74 | 48 | 74 | 74 | 74 |
| Spot Test 1% Acid | 48 | 39 | 48 | 51 | 48 |
| Substrate: Primer: | | | GPX05379 | | |
| Basecoat: | | | EWB Black | | |
| Humidity (100%/37.8° C.) | | | | | |
| Final 20° Gloss | 93 | 92 | 92 | 90 | 90 |
| Final Haze | 15 | 14 | 17 | 25 | 17 |
| Final DOI | 82 | 85 | 83 | 81 | 83 |
| % Cross Hatch <1 hour | 0 | 0 | 0 | 0 | 0 |
| Initial L | −25.47 | −25.43 | −25.35 | −25.19 | −25.31 |
| Final L | −26.96 | −26.63 | −26.49 | −26.67 | −26.28 |
| dL(+Lighter)(−Darker) | 1.49 | 1.20 | 1.14 | 1.48 | 0.97 |

Data in the tables indicate that curable film-forming compositions prepared according to the present invention demonstrate improved flow characteristics as evidenced by decreased short wave scan measurements, without significant loss of other essential properties, such as gloss, DOI, mar resistance and acid etch resistance.

The present invention has been described with reference to specific details of particular embodiments thereof. It is not intended that such details be regarded as limitations upon the scope of the invention except insofar as and to the extent that they are included in the accompanying claims.

We claim:

1. A curable, aqueous film-forming composition comprising:
   (a) a polymeric binder containing two or more reactive functional groups;
   (b) a curing agent having at least two functional groups which are reactive with the reactive functional groups of (a); and
   (c) a copolymer flow control agent, at least 30 mol % of the copolymer comprising residues having the following alternating structural units:

-[DM-AM]- wherein DM represents a residue from a donor monomer, and AM represents a residue from an acceptor monomer, at least 15 mol % of the copolymer comprising a donor monomer having the following structure (I):

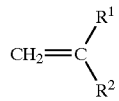 (I)

wherein $R^1$ is linear or branched $C_1$ to $C_4$ alkyl, $R^2$ is selected from the group consisting of methyl, linear, cyclic or branched $C_1$ to $C_{20}$ alkyl, alkenyl, aryl, alkaryl and aralkyl.

2. The film-forming composition of claim 1, wherein at least 15 mol % of the copolymer comprises an acrylic monomer as an acceptor monomer.

3. The film-forming composition of claim 1, wherein the copolymer contains at least one salt group or salt forming group.

4. The film-forming composition of claim 1, wherein the copolymer contains hydroxyl functionality.

5. The film-forming composition of claim 1, wherein the copolymer is substantially free of maleate monomer segments and fumarate monomer segments.

6. The film-forming composition of claim 1, wherein the copolymer composition is substantially free of Lewis acids and transition metals.

7. The film-forming composition of claim 1, wherein the donor monomer is one or more selected from the group consisting of isobutylene, diisobutylene, dipentene, and isoprenol optionally in combination with styrene, substituted styrenes, methyl styrene, substituted styrenes, vinyl ethers, and vinyl pyridine.

8. The film-forming composition of claim 1, wherein the donor monomer of structure I is selected from the group consisting of isobutylene, diisobutylene, dipentene, isoprenol, and mixtures thereof.

9. The film-forming composition of claim 1, wherein the group $R^2$ of the donor monomer of structure I includes one or more functional groups selected from the group consisting of hydroxy, epoxy, carboxylic acid, ether, carbamate, and amide.

10. The film-forming composition of claim 1, wherein the acceptor monomer comprises one or more described by the structure (II):

wherein W is selected from the group consisting of —CN, —X, and —C(=O)—Y, wherein Y is selected from the group consisting of —$NR^3_2$, —O—$R^5$—O—C(=O)—$NR^3_2$, and —$OR^4$, $R^3$ is selected from the group consisting of H, linear or branched $C_1$ to $C_{20}$ alkyl, and linear or branched $C_1$ to $C_{20}$ alkylol, $R^4$ is selected from the group consisting of H, poly(ethylene oxide), poly(propylene oxide), poly(caprolactone), linear or branched $C_1$ to $C_{20}$ alkyl, alkylol, aryl, alkaryl and aralkyl, linear or branched $C_1$ to $C_{20}$ fluoroalkyl, fluoroaryl, fluoroalkaryl and fluoroaralkyl, and a polysiloxane radical, $R^5$ is a divalent linear or branched $C_1$ to $C_{20}$ alkyl linking group, and X is a halide.

11. The film-forming composition of claim 2, wherein the acrylic monomer is one or more described by structure (III):

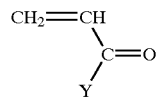 (III)

wherein Y is selected from the group consisting of —$NR^3_2$, —O—$R^5$—O—C(=O)—$NR^3_2$, and —$OR^4$, $R^3$ is selected from the group consisting of H, linear or branched $C_1$ to $C_{20}$ alkyl and linear or branched $C_1$ to $C_{20}$ alkylol, $R^4$ is selected from the group consisting of H, poly(ethylene oxide), poly (propylene oxide), linear or branched $C_1$ to $C_{20}$ alkyl, alkylol, aryl, alkaryl and aralkyl, linear or branched $C_1$ to $C_{20}$ fluoroalkyl, fluoroaryl and fluoroaralkyl, and a polysiloxane radical, and $R^5$ is a divalent linear or branched $C_1$ to $C_{20}$ alkyl linking group.

12. The film-forming composition of claim 11, wherein Y includes at least one functional group selected from the group consisting of hydroxy, amide, oxazoline, aceto acetate, blocked isocyanate, carbamate, and amine.

13. The film-forming composition of claim 3, in which the salt group is selected from the class consisting of carboxylic acid salt, amine salt, quaternized ammonium, quaternized phosphonium, and ternary sulfonium.

14. The film-forming composition of claim 1, wherein the copolymer has a polydispersity index of less than 4.

15. The film-forming composition of claim 1, wherein the alternating structural units comprise at least 50 mol % of the copolymer.

16. The film-forming composition of claim 1, wherein the acceptor monomer is one or more selected from the group consisting of hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, chlorotrifluoro ethylene, glycidyl acrylate, 2-ethylhexyl acrylate, and n-butoxy methyl acrylamide.

17. The film-forming composition of claim 1, wherein the copolymer comprises one or more residues derived from other ethylenically unsaturated monomers of general formula VII:

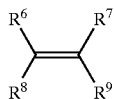

(VII)

wherein $R^6$, $R^7$, and $R^9$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl, $R^8$ is selected from the group consisting of H, $C_1$–$C_6$ alkyl, and $COOR^{15}$, wherein $R^{15}$ is selected from the group consisting of H, an alkali metal, a $C_1$ to $C_6$ alkyl group, glycidyl and aryl.

18. The film-forming composition of claim 17, wherein the other ethylenically unsaturated monomers are one or more selected from the group consisting of methacrylic monomers and allylic monomers.

19. A multi-component composite coating composition comprising a base coat deposited from a pigmented film-forming composition and a transparent topcoat composition applied over the base coat in which the transparent topcoat is deposited from a film-forming composition which is substantially free of organic solvent, said topcoat film-forming composition comprising a curable, aqueous film-forming composition comprising:

(a) a polymeric binder containing two or more reactive functional groups;

(b) a curing agent having at least two functional groups which are reactive with the reactive functional groups of (a); and (c) a copolymer flow control agent, at least 30 mol % of the copolymer comprising residues having the following alternating structural units:

-[DM-AM]- wherein DM represents a residue from a donor monomer, AM represents a residue from an acceptor monomer, at least 15 mol % of the copolymer comprising a donor monomer having the following structure (I):

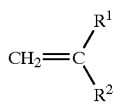

(I)

wherein $R^1$ is linear or branched $C_1$ to $C_4$ alkyl, $R^2$ is selected from the group consisting of methyl, linear, cyclic or branched $C_1$ to $C_{20}$ alkyl, alkenyl, aryl, alkaryl and aralkyl.

20. The multi-component composite coating composition of claim 19, wherein at least 15 mol % of the copolymer comprises an acrylic monomer as an acceptor monomer.

21. The multi-component composite coating composition of claim 19, wherein the copolymer contains at least one salt group or salt forming group.

22. The multi-component composite coating composition of claim 19, wherein the copolymer contains hydroxyl functionality.

23. The multi-component composite coating composition of claim 19, wherein the copolymer is substantially free of maleate monomer segments and fumarate monomer segments.

24. The multi-component composite coating composition of claim 19, wherein the copolymer composition is substantially free of Lewis acids and transition metals.

25. The multi-component composite coating composition of claim 19, wherein the donor monomer is one or more selected from the group consisting of isobutylene, diisobutylene, dipentene, and isoprenol optionally in combination with styrene, substituted styrenes, methyl styrene, substituted styrenes, vinyl ethers, and vinyl pyridine.

26. The multi-component composite coating composition of claim 19, wherein the donor monomer of structure I is selected from the group consisting of isobutylene, diisobutylene, dipentene, isoprenol, and mixtures thereof.

27. The multi-component composite coating composition of claim 19, wherein the group $R^2$ of the donor monomer of structure I includes one or more functional groups selected from the group consisting of hydroxy, epoxy, carboxylic acid, ether, carbamate, and amide.

28. The multi-component composite coating composition of claim 19, wherein the acceptor monomer comprises one or more described by the structure (II):

(II)

wherein W is selected from the group consisting of —CN, —X, and —C(=O)—Y, wherein Y Is selected from the group consisting of —$NR^3_2$, —O—$R^5$—O—C(=O)—$NR^3_2$, and —$OR^4$, $R^3$ is selected from the group consisting of H, linear or branched $C_1$ to $C_{20}$ alkyl, and linear or branched $C_1$ to $C_{20}$ alkylol, $R^4$ is selected from the group consisting of H, poly(ethylene oxide), poly(propylene oxide), poly(caprolactone), linear or branched $C_1$ to $C_{20}$ alkyl, alkylol, aryl, alkaryl and aralkyl, linear or branched $C_1$ to $C_{20}$ fluoroalkyl, fluoroaryl, fluoroalkaryl and fluoroaralkyl, and a polysiloxane radical, $R^5$ is a divalent linear or branched $C_1$ to $C_{20}$ alkyl linking group, and X is a halide.

29. The multi-component composite coating composition of claim 20, wherein the acrylic monomer is one or more described by structure (III):

(III)

wherein Y is selected from the group consisting of —$NR^3_2$, —O—$R^5$—O—C(=O)—$NR^3_2$, and —$OR^4$, $R^3$ is selected from the group consisting of H, linear or branched $C_1$ to $C_{20}$ alkyl and linear or branched $C_1$ to $C_{20}$ alkylol, $R^4$ is selected from the group consisting of H, poly(ethylene oxide), poly (propylene oxide), linear or branched $C_1$ to $C_{20}$ alkyl, alkylol, aryl alkaryl and aralkyl, linear or branched $C_1$ to $C_{20}$ fluoroalkyl, fluoroaryl and fluoroaralkyl, and a polysiloxane radical, and $R^5$ is a divalent linear or branched $C_1$ to $C_{20}$ alkyl linking group.

30. The multi-component composite coating composition of claim 29, wherein Y includes at least one functional group selected from the group consisting of hydroxy, amide, oxazoline, aceto acetate, blocked isocyanate, carbamate, and amine.

31. The multi-component composite coating composition of claim 21, in which the salt group is selected from the class consisting of carboxylic acid salt, amine salt, quaternized ammonium, quaternized phosphonium, and ternary sulfonium.

32. The multi-component composite coating composition of claim 19, wherein the copolymer has a polydispersity index of less than 4.

33. The multi-component composite coating composition of claim 19, wherein the alternating structural units comprise at least 50 mol % of the copolymer.

34. The multi-component composite coating composition of claim 19, wherein the acceptor monomer is one or more selected from the group consisting of hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, chlorotrifluoro ethylene, glycidyl acrylate, 2-ethylhexyl acrylate, and n-butoxy methyl acrylamide.

35. The multi-component composite coating composition of claim 19, wherein the copolymer comprises one or more residues derived from other ethylenically unsaturated monomers of general

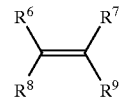

(VII)

formula VII:

wherein $R^6$, $R^7$, and $R^9$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl, $R^8$ is selected from the group consisting of H, $C_1$–$C_6$ alkyl, and $COOR^{15}$, wherein $R^{15}$ is selected from the group consisting of H, an alkali metal, a $C_1$ to $C_6$ alkyl group, glycidyl and aryl.

36. The multi-component composite coating composition of claim 35, wherein the other ethylenically unsaturated monomers are one or more selected from the group consisting of methacrylic monomers and allylic monomers.

* * * * *